(12) United States Patent
Kikuchi

(10) Patent No.: US 9,282,305 B2
(45) Date of Patent: Mar. 8, 2016

(54) IMAGING DEVICE AND IMAGE GENERATION METHOD

(71) Applicant: OLYMPUS CORPORATION, Shibuya-ku, Tokyo (JP)

(72) Inventor: Sunao Kikuchi, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/540,837

(22) Filed: Nov. 13, 2014

(65) Prior Publication Data

US 2015/0070528 A1 Mar. 12, 2015

Related U.S. Application Data

(63) Continuation of application No. PCT/JP2013/075622, filed on Sep. 24, 2013.

(30) Foreign Application Priority Data

Oct. 23, 2012 (JP) .................................. 2012-234002

(51) Int. Cl.
*H04N 9/73* (2006.01)
*H04N 9/07* (2006.01)
(Continued)

(52) U.S. Cl.
CPC .......... *H04N 9/735* (2013.01); *H04N 5/23229* (2013.01); *H04N 5/332* (2013.01); *H04N 9/07* (2013.01); *H04N 2209/047* (2013.01)

(58) Field of Classification Search
CPC ... H04N 9/735; H04N 5/23229; H04N 5/332; H04N 9/07; H04N 2209/047

USPC ............................ 348/223.1–229.1, 272–276
See application file for complete search history.

(56) References Cited

U.S. PATENT DOCUMENTS

| 5,629,734 | A | 5/1997 | Hamilton et al. |
| 8,546,737 | B2 * | 10/2013 | Tian ...................... H04N 5/332 250/208.1 |

(Continued)

FOREIGN PATENT DOCUMENTS

| JP | 08298669 A | 11/1996 |
| JP | 2003087806 A | 3/2003 |

(Continued)

OTHER PUBLICATIONS

International Search Report and Written Opinion dated Jan. 7, 2014 issued in International Application No. PCT/JP2013/075622.

*Primary Examiner* — Yogesh Aggarwal
(74) *Attorney, Agent, or Firm* — Holtz, Holtz & Volek PC

(57) ABSTRACT

An imaging device includes: an image sensor that includes a color filter array in which normal image generation color filters corresponding to three or more bands and correction information generation color filters differing in spectral sensitivity characteristics from the normal image generation color filters are placed in an array; a normal image generation section that generates a normal image in which pixel values of missing pixels are interpolated; a spectral estimation section that performs a spectral estimation process based on pixel values obtained using at least the correction information generation color filters; a correction information generation section that generates correction information that corrects the normal image based on a spectral estimate value; and a corrected image generation section that performs a correction process on the normal image based on the correction information to generate a corrected image.

18 Claims, 17 Drawing Sheets

(51) Int. Cl.
*H04N 5/232* (2006.01)
*H04N 5/33* (2006.01)

(56) References Cited

U.S. PATENT DOCUMENTS

| 2006/0119738 | A1* | 6/2006 | Kido .................... G06T 3/4015 348/571 |
|---|---|---|---|
| 2011/0122283 | A1 | 5/2011 | Nagata |
| 2011/0298909 | A1 | 12/2011 | Ando et al. |

FOREIGN PATENT DOCUMENTS

| JP | 2005033609 A | 2/2005 |
|---|---|---|
| JP | 2006005500 A | 1/2006 |
| JP | 2008136251 A | 6/2008 |
| JP | 2009181449 A | 8/2009 |
| JP | 2009237817 A | 10/2009 |
| JP | 2009290694 A | 12/2009 |
| JP | 2011109620 A | 6/2011 |
| JP | 2011211317 A | 10/2011 |
| JP | 2012014668 A | 1/2012 |

* cited by examiner

| C11 | C12 | C15 | C16 | C11 | C12 | C15 | C16 |
|-----|-----|-----|-----|-----|-----|-----|-----|
| C9  | C10 | C13 | C14 | C9  | C10 | C13 | C14 |
| C3  | C4  | C7  | C8  | C3  | C4  | C7  | C8  |
| C1  | C2  | C5  | C6  | C1  | C2  | C5  | C6  |
| C11 | C12 | C15 | C16 | C11 | C12 | C15 | C16 |
| C9  | C10 | C13 | C14 | C9  | C10 | C13 | C14 |
| C3  | C4  | C7  | C8  | C3  | C4  | C7  | C8  |
| C1  | C2  | C5  | C6  | C1  | C2  | C5  | C6  |
| C11 | C12 | C15 | C16 | C11 | C12 | C15 | C16 |
| C9  | C10 | C13 | C14 | C9  | C10 | C13 | C14 |
| C3  | C4  | C7  | C8  | C3  | C4  | C7  | C8  |
| C1  | C2  | C5  | C6  | C1  | C2  | C5  | C6  |
| C11 | C12 | C15 | C16 | C11 | C12 | C15 | C16 |
| C9  | C10 | C13 | C14 | C9  | C10 | C13 | C14 |
| C3  | C4  | C7  | C8  | C3  | C4  | C7  | C8  |
| C1  | C2  | C5  | C6  | C1  | C2  | C5  | C6  |

ND IMAGE
IMAGING DEVICE AND IMAGE GENERATION METHOD

CROSS REFERENCE TO RELATED APPLICATION

This application is a continuation of International Patent Application No. PCT/JP2013/075622, having an international filing date of Sep. 24, 2013, which designated the United States, the entirety of which is incorporated herein by reference. Japanese Patent Application No. 2012-234002 filed on Oct. 23, 2012 is also incorporated herein by reference in its entirety.

BACKGROUND

The present invention relates to an imaging device, an image generation method, and the like.

An imaging device has been known in which an R (red) color filter, a G (green) color filter, and a B (blue) color filter are provided to an image sensor in order to capture a full-color image. Such an imaging device can generate a highly accurate normal image since the number of bands (types) of color filters is small, and the sampling density of the pixels corresponding to each band is relatively high.

In recent years, a multiband imaging technique has attracted attention as a means for accurately reproducing the color of the object. For example, JP-A-2003-87806 and JP-A-2008-136251 disclose a multiband imaging device that acquires spectral information about the object using a single-chip multiband image sensor provided with four or more types of color filters.

JP-A-2011-211317 discloses a method that utilizes an imaging device in which a spectrum measurement sensor is provided in addition to an image sensor, and generates correction information that improves color reproducibility based on information obtained from the spectrum measurement sensor to correct a normal image (RGB image) obtained using the image sensor.

SUMMARY

According to one aspect of the invention, there is provided an imaging device comprising:

an image sensor that includes a color filter array in which normal image generation color filters and correction information generation color filters are placed in an array, the normal image generation color filters corresponding to three or more bands, and the correction information generation color filters differing in spectral sensitivity characteristics from the normal image generation color filters;

a normal image generation section that performs an interpolation process on pixel values obtained using the normal image generation color filters to generate a normal image in which pixel values of missing pixels are interpolated;

a spectral estimation section that performs a spectral estimation process based on pixel values obtained using at least the correction information generation color filters;

a correction information generation section that generates correction information that corrects the pixel values of the normal image based on a spectral estimate value obtained by the spectral estimation section; and a corrected image generation section that performs a correction process on the normal image based on the correction information to generate a corrected image.

According to another aspect of the invention, there is provided an imaging device comprising:

an image sensor that includes a color filter array in which normal image generation color filters and correction information generation color filters are placed in an array, the normal image generation color filters corresponding to three or more bands, and the correction information generation color filters differing in spectral sensitivity characteristics from the normal image generation color filters;

a normal image generation section that performs an interpolation process on pixel values obtained using the normal image generation color filters to generate a normal image in which pixel values of missing pixels are interpolated;

a spectral estimation section that performs a spectral estimation process based on pixel values obtained using at least the correction information generation color filters;

a correction information generation section that generates correction information that corrects the pixel values of the normal image based on a spectral estimate value obtained by the spectral estimation section;

a corrected image generation section that performs a correction process on the normal image based on the correction information to generate a corrected image;

an attention area detection section that detects an attention area within the normal image that includes an object image having information within a specific wavelength band based on data of the spectral estimate value; and a display state setting section that performs a display state setting process on the detected attention area.

According to another aspect of the invention, there is provided an image generation method comprising:

performing an interpolation process on pixel values obtained using normal image generation color filters corresponding to three or more bands to generate a normal image in which pixel values of missing pixels are interpolated;

performing a spectral estimation process based on pixel values obtained using at least correction information generation color filters that differ in spectral sensitivity characteristics from the normal image generation color filters;

generating correction information that corrects the pixel values of the normal image based on a spectral estimate value obtained as a result of the spectral estimation process;

performing a correction process on the normal image based on the correction information to generate a corrected image.

According to another aspect of the invention, there is provided an image generation method comprising:

performing an interpolation process on pixel values obtained using normal image generation color filters corresponding to three or more bands to generate a normal image in which pixel values of missing pixels are interpolated;

performing a spectral estimation process based on pixel values obtained using at least correction information generation color filters that differ in spectral sensitivity characteristics from the normal image generation color filters;

detecting an attention area within the normal image that includes an object image having information within a specific wavelength band based on data of a spectral estimate value obtained as a result of the spectral estimation process; and performing a display state setting process on the detected attention area.

BRIEF DESCRIPTION OF THE DRAWINGS

FIG. 16 is a view illustrating a thinning readout process.

DESCRIPTION OF EXEMPLARY EMBODIMENTS

Figure 1:
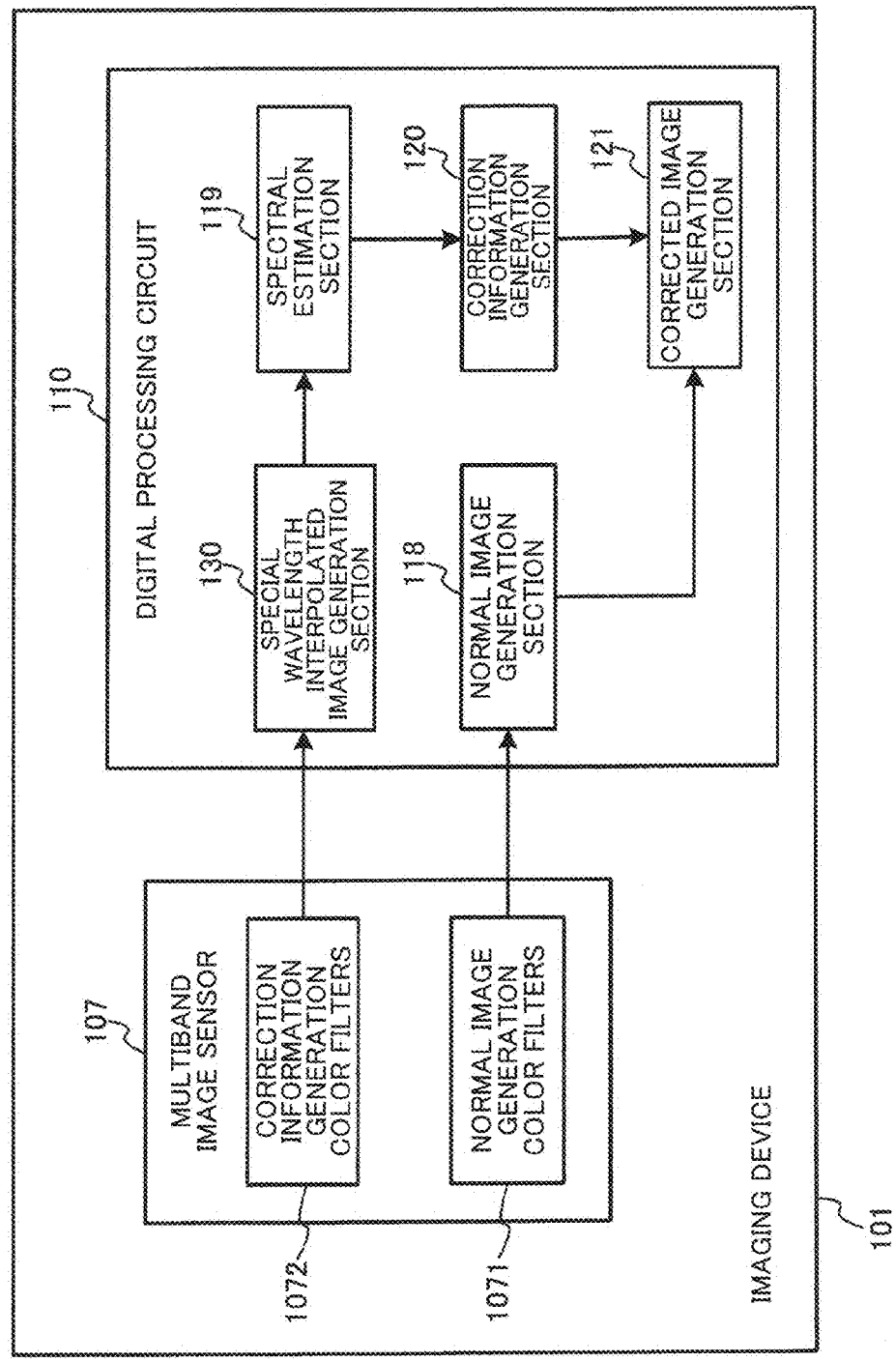
FIG. 1 illustrates a configuration example of a digital processing circuit included in an imaging device according to a first embodiment.

Several exemplary embodiments of the invention may provide an imaging device, an image generation method, and the like that can correct a normal image using estimated spectral information while suppressing a deterioration in image quality.

According to the above configuration, the normal image generation section performs the interpolation process on the pixel values obtained using the normal image generation color filters to generate the normal image in which the pixel values of the missing pixels are interpolated. The spectral estimation section performs the spectral estimation process based on the pixel values obtained using at least the correction information generation color filters. The correction information generation section generates the correction information that corrects the pixel values of the normal image based on the spectral estimate value. The corrected image generation section performs the correction process on the normal image based on the correction information to generate the corrected image.

This makes it possible to correct the normal image using the estimated spectral information while suppressing a deterioration in image quality.

The correction information generation section may generate the correction information that corresponds to a plurality of pixel values of the normal image based on data of one spectral estimate value that is obtained from one pixel value during the spectral estimation process.

This makes it unnecessary to perform a process that generates the correction information corresponding to one pixel of the normal image. Therefore, the amount of processing can be reduced, for example.

The imaging device may include an attention area detection section that detects an attention area within the normal image that includes an object image having information within a specific wavelength band based on data of the spectral estimate value, and a display state setting section that performs a display state setting process on the detected attention area.

This makes it possible to improve visibility (e.g., lesion detection visibility or blood vessel detection visibility) when capturing a medical image or the like, for example.

The normal image generation color filters may include an R color filter, a G color filter, and a B color filter, and the correction information generation color filters may be placed in the color filter array at a sampling density lower than that of the R color filter, the G color filter, and the B color filter.

This makes it possible to minimize a deterioration in accuracy of the normal image (RGB image), for example.

The G color filter included in the normal image generation color filters may be placed in the color filter array at intersections of an odd-numbered row and an odd-numbered column and intersections of an even-numbered row and an even-numbered column, or intersections of an odd-numbered row and an even-numbered column and intersections of an even-numbered row and an odd-numbered column.

This makes it possible to generate a highly accurate G normal image. It is also possible to suppress a deterioration in accuracy of the R normal image and the B normal image by interpolating the R pixel value and the B pixel value by using the high-frequency component of the G normal image, for example.

The imaging device may further include a special wavelength interpolated image generation section that performs a special wavelength interpolated image generation process that generates a special wavelength interpolated image that is used to generate the correction information based on the pixel values obtained using the correction information generation color filters, the special wavelength interpolated image generation section may perform an interpolation process on the pixel values obtained using the correction information generation color filters as the special wavelength interpolated image generation process to generate the special wavelength interpolated image in which pixel values of missing pixels are interpolated, and the spectral estimation section may perform the spectral estimation process based on the special wavelength interpolated image.

This makes it possible to apply various spectral estimation methods that utilize the special wavelength interpolated image, for example.

The special wavelength interpolated image generation section may generate the special wavelength interpolated image having a resolution lower than that of the normal image generated by the normal image generation section, the spectral estimation section may perform the spectral estimation process at the resolution of the special wavelength interpolated image based on at least the pixel values of the special wavelength interpolated image, the correction information generation section may generate the correction information that corresponds to a plurality of pixel values of the normal image based on data of one spectral estimate value obtained as a result of the spectral estimation process, and the corrected image generation section may perform the correction process at the resolution of the normal image using the generated correction information.

This makes it possible to perform the correction information generation process using the special wavelength interpolated image having low resolution, and reduce the amount of processing, for example.

The spectral estimation section may extract a light source color pixel that represents a color of a light source from the normal image, and estimate a light source spectrum of the extracted light source color pixel to calculate a light source spectral estimate value, and the correction information generation section may compare data of the light source spectral estimate value with light source spectral data stored in advance to estimate the light source.

This makes it possible to accurately estimate the light source even when it is difficult to determine the light source using only the information about the RGB pixel values, for example.

The corrected image generation section may perform the correction process that corrects a white balance based on the estimated light source, on the normal image.

This makes it possible to implement a highly accurate white balance correction process even when it is difficult to determine the light source using only the information about the RGB pixel values, for example.

The correction information generation section may generate the correction information corresponding to each area among a plurality of areas that are set within the normal image, and the corrected image generation section may perform the correction process on the normal image using the correction information corresponding to each area within the normal image that has been generated by the correction information generation section.

This makes it possible to perform a highly accurate correction process corresponding to each area set within the image, for example.

The correction information generation section may perform a comparison process that compares data of the spectral estimate value estimated by the spectral estimation section with detection target spectral data stored in advance, detect a specific spectral area having a specific spectrum based on a result of the comparison process, and generate the correction information based on a detection result for the specific spectral area.

This makes it possible to implement a highly accurate area detection process even when it is difficult to detect the specific spectral area using only the RGB information, for example.

The spectral estimation section may extract a light source spectral data measurement pixel that represents a color of a light source from the special wavelength interpolated image, and estimate a light source spectrum of the extracted light source spectral data measurement pixel to calculate a light source spectral estimate value, and the corrected image generation section may perform a process that corrects a white balance based on the light source spectral estimate value, on the normal image.

It is possible to estimate the light source while reducing the amount of processing by estimating the light source color pixel from the information obtained from the special wavelength interpolated image, and directly estimating the light source spectrum, for example.

The spectral estimation section may perform the spectral estimation process on the special wavelength interpolated image based on white light source spectral data, and the correction information generation section may compare data of the spectral estimate value with light source spectral data stored in advance within a specific wavelength region to estimate a light source.

This makes it possible to simply estimate the light source having a characteristic spectrum having bright lines, for example.

The spectral estimation section may perform a thinning readout process that reads the pixel values obtained using the correction information generation color filters without reading the pixel values obtained using the normal image generation color filters when reading the pixel values from the image sensor, and perform the spectral estimation process using the pixel values read by the thinning readout process.

This makes it possible to increase the processing speed, for example.

The normal image generation color filters and the correction information generation color filters included in the image sensor may be an infrared filter that has a peak wavelength within an infrared wavelength region.

This makes it possible to generate a more accurate corrected image when the image is characterized by the spectrum within the infrared region (e.g., medical image), for example.

The infrared wavelength region may be a wavelength band of 790 to 820 nm or 905 to 970 nm.

This makes it possible to use an infrared filter having the peak wavelength within a wavelength band of 790 to 820 nm or 905 to 970 nm, for example.

A first embodiment and a second embodiment of the invention are described below. The background of each embodiment, and an outline of the method according to each embodiment will be described first. A system configuration example and the details of the process according to each embodiment will then be described. The method according to the first embodiment and the second embodiment will be described thereafter. Note that the embodiments described below do not in any way limit the scope of the invention laid out in the claims. Note also that all of the elements described below in connection with the embodiments should not necessarily be taken as essential elements of the invention.

1. Outline

An imaging device has been known in which an R (red) color filter, a G (green) color filter, and a B (blue) color filter are provided to an image sensor in order to capture a full-color image. Such an imaging device can generate a highly accurate normal image since the number of bands (types) of color filters is small, and the sampling density of the pixels corresponding to each band is relatively high.

However, it is difficult to achieve sufficient estimation accuracy using only imaging information acquired using the three types of color filters when estimating detailed spectral information about the object.

In recent years, a multiband imaging technique has attracted attention as a means for accurately reproducing the color of the object. For example, JP-A-2003-87806 and JP-A-2008-136251 disclose a multiband imaging device that acquires spectral information about the object using a single-chip multiband image sensor provided with four or more types of color filters.

However, the technique disclosed in JP-A-2003-87806 and JP-A-2008-136251 has problems in that the process becomes complex, and a decrease in resolution occurs in principle due to a decrease in sampling density of each band. A decrease in accuracy of the normal image also occurs due to a decrease in sampling density of each band, and a deterioration in image quality occurs due to occurrence of a false color and the like.

JP-A-2011-211317 discloses a method that utilizes an imaging device in which a spectrum measurement sensor is provided in addition to an image sensor, and generates correction information that improves color reproducibility based on information obtained from the spectrum measurement sensor to correct a normal image (RGB image) obtained using the image sensor.

However, the method disclosed in JP-A-2011-211317 has problems in that the size and the cost of the device increase.

An imaging device and the like according to the first embodiment and the second embodiment make it possible to correct a normal image using estimated spectral information while minimizing a deterioration in image quality using a single-chip multiband image sensor that has four or more types of spectral sensitivity characteristics.

The imaging device according to the first embodiment and the second embodiment may effectively be used for normal image color correction, light source detection, object detection, and the like. In such a case, spectral information about the object is estimated, and the normal image is corrected using the results of a process based on the spectral information.

2. First Embodiment

The first embodiment illustrates an example in which a spectral estimation process is performed on a pixel basis using a known light source to generate a corrected image with improved color reproducibility.

2.1 System Configuration Example

FIG. 1 illustrates a system configuration example according to the first embodiment.

An imaging device 101 includes a multiband image sensor 107 that includes four or more types of color filters that differ in spectral sensitivity characteristics, and photoelectrically converts an object image, and a digital processing circuit 110 that performs digital processing. As illustrated in FIG. 1, the digital processing circuit 110 includes a normal image generation section 118, a special wavelength interpolated image generation section 130, a spectral estimation section 119, a correction information generation section 120, and a corrected image generation section 121 as functional sections for generating a corrected image based on spectral estimation results. The multiband image sensor 107 includes normal image generation color filters 1071 and correction information generation color filters 1072. Note that the imaging device 101 is not limited to the configuration illustrated in FIG. 1. Various modifications may be made, such as omitting some of the elements illustrated in FIG. 1, or adding other elements.

The connection relationship between each section is described below. The multiband image sensor 107 is connected to the normal image generation section 118 and the special wavelength interpolated image generation section 130. The normal image generation section 118 is connected to the corrected image generation section 121, and the special wavelength interpolated image generation section 130 is connected to the spectral estimation section 119. The spectral estimation section 119 is connected to the correction information generation section 120, and the correction information generation section 120 is connected to the corrected image generation section 121.

Figure 2:
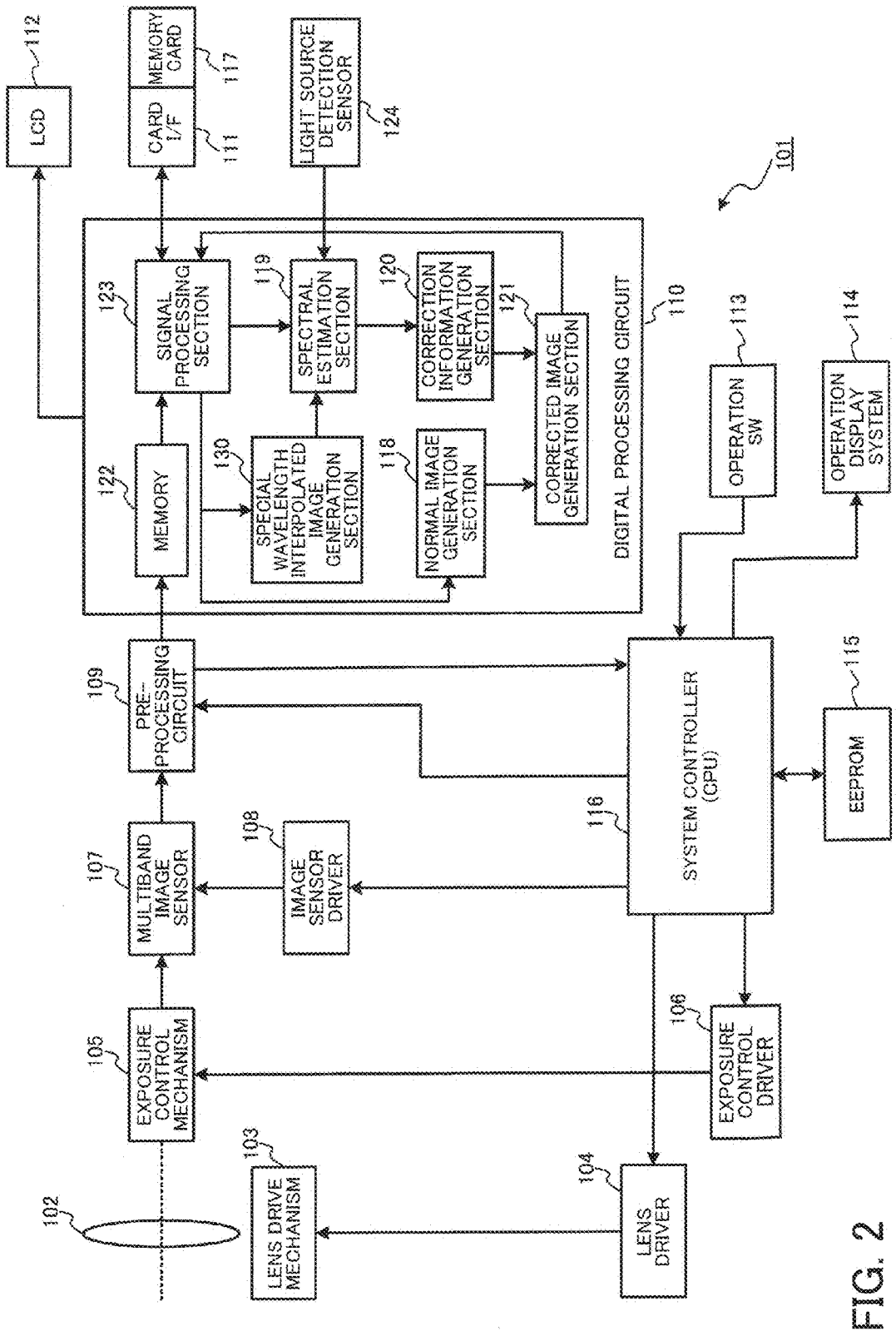
FIG. 2 illustrates a configuration example of an imaging device according to the first embodiment.

FIG. 2 illustrates an example of the entire imaging device having the configuration illustrated in FIG. 1.

The imaging device 101 includes an imaging lens system 102 that includes various lenses (imaging lenses), a lens drive mechanism 103 that drives the imaging lens system 102 forward and backward, and drives a zoom lens and a focus lens included in the imaging lens system 102, a lens driver 104 that controls the lens drive mechanism 103, an exposure control mechanism 105 that controls the aperture and the shutter of the imaging lens system 102, an exposure control driver 106 that controls the exposure control mechanism 105, the multiband image sensor 107 that photoelectrically converts an object image, and includes four or more types of color filters that differ in spectral sensitivity characteristics, an image sensor driver 108 that drives the image sensor, a preprocessing circuit 109 that includes an analog amplifier, an A/D converter, and the like, the digital processing circuit 110 that performs digital processing such as a color signal process for generating an image and a compression/decompression process, a card interface 111 that functions as an interface with a memory card (external recording device), a liquid crystal display (LCD) image display system 112, an operation switch system 113 that includes a shutter release switch, a setting button, and the like, an operation display system 114 that displays an operation state, a mode state, and the like, a nonvolatile memory 115 that stores setting information and the like, and a system controller 116 that controls each section.

The process performed by the digital processing circuit 110 is described below.

The normal image generation section 118 performs a demosaicing process on each pixel of RAW data obtained using the normal image generation color filters 1071 included in the multiband image sensor 107 to generate a normal image.

The special wavelength interpolated image generation section 130 generates a special wavelength interpolated image based on pixel values obtained using the correction information generation color filters 1072 included in the multiband image sensor 107.

The spectral estimation section 119 performs a spectral estimation process using the special wavelength interpolated image generated by the special wavelength interpolated image generation section 130, and light source information stored in the spectral estimation section 119.

The correction information generation section 120 generates correction information applied to an RGB image (normal image) using spectral information obtained from the spectral estimation section 119.

The corrected image generation section 121 generates a corrected image using the normal image (RGB image) generated by the normal image generation section 118, and the correction information generated by the correction information generation section 120.

A signal processing section 123 performs digital processing (e.g., color signal generation process) to generate the final image.

Note that the functions of the normal image generation section 118, the special wavelength interpolated image generation section 130, the spectral estimation section 119, the correction information generation section 120, and the corrected image generation sections 121 may be implemented by hardware such as a processor (e.g., CPU) or an ASIC (e.g., gate array), a program, or the like.

The system controller 116 controls the entire imaging device 101. Specifically, the system controller 116 controls the lens driver 104, the exposure control driver 106, and the image sensor driver 108 to drive the multiband image sensor 107 to implement exposure (charge storage) and a signal readout process. The signals are subjected to an A/D conversion process through the preprocessing circuit 109, input to the digital processing circuit 110, subjected to a signal process in the digital processing circuit 110, and recorded on the memory card 117 through the card interface 111.

Figure 3:
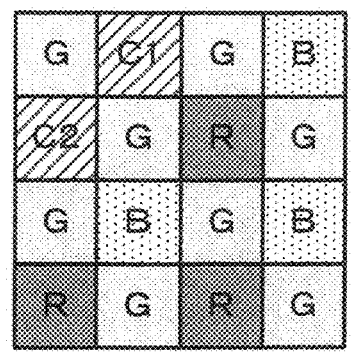
FIG. 3 illustrates an example of a CFA that utilizes correction information generation color filters corresponding to two bands.

FIG. 3 illustrates a color filter array (hereinafter may be abbreviated as "CFA") having five types of spectral sensitivity characteristics as an arrangement example of four or more types of color filters that differ in spectral sensitivity characteristics and are placed corresponding to the pixels of the multiband image sensor. In the color filter array illustrated in FIG. 3, RGB pixels are placed in a number larger than that of pixels corresponding to special wavelengths C1 and C2 in order to increase the RGB sampling density for generating the normal image.

When using a Bayer CFA that includes three types of color filters, the demosaicing process is normally performed using information about the G pixels having the highest density. In the CFA illustrated in FIG. 3, the pixels corresponding to the special wavelengths C1 and C2 are placed at the positions at which the R pixel and the B pixel are placed in the Bayer array so that the G pixels have the same sampling density as that of the G pixels included in the Bayer array. The image sensor has a configuration in which the CFA illustrated in FIG. 3 is repeatedly arranged.

Figure 4:
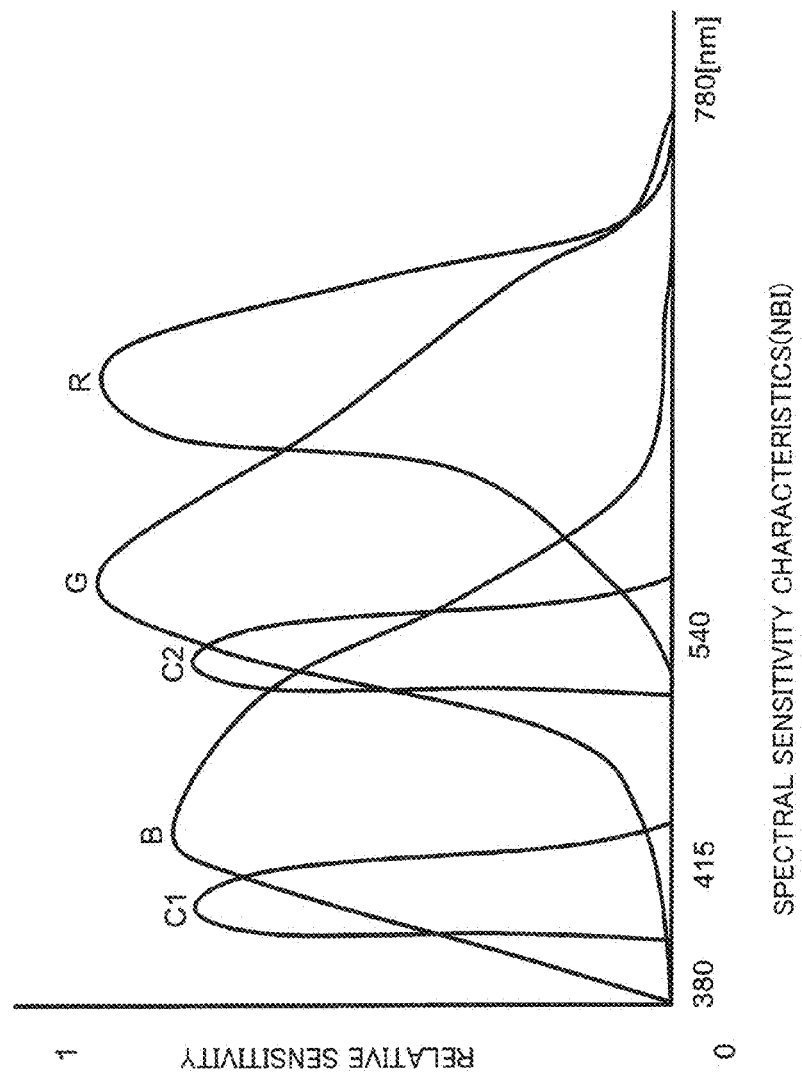
FIG. 4 illustrates an example of the spectral sensitivity characteristics of a color filter.

The color filters used in JP-A-2008-136251 and the like have the spectral sensitivity characteristics illustrated in FIG. 4 (graph), for example. In JP-A-2008-136251 and the like, pixel values obtained using the special wavelengths C1 and C2 are also used to generate the normal image. Therefore, the C1 and C2 bands (special wavelengths) overlap the B and G bands in order to supplement the range in which the relative sensitivity of the B and G bands decreases with the C1 and C2 bands.

Figure 5:
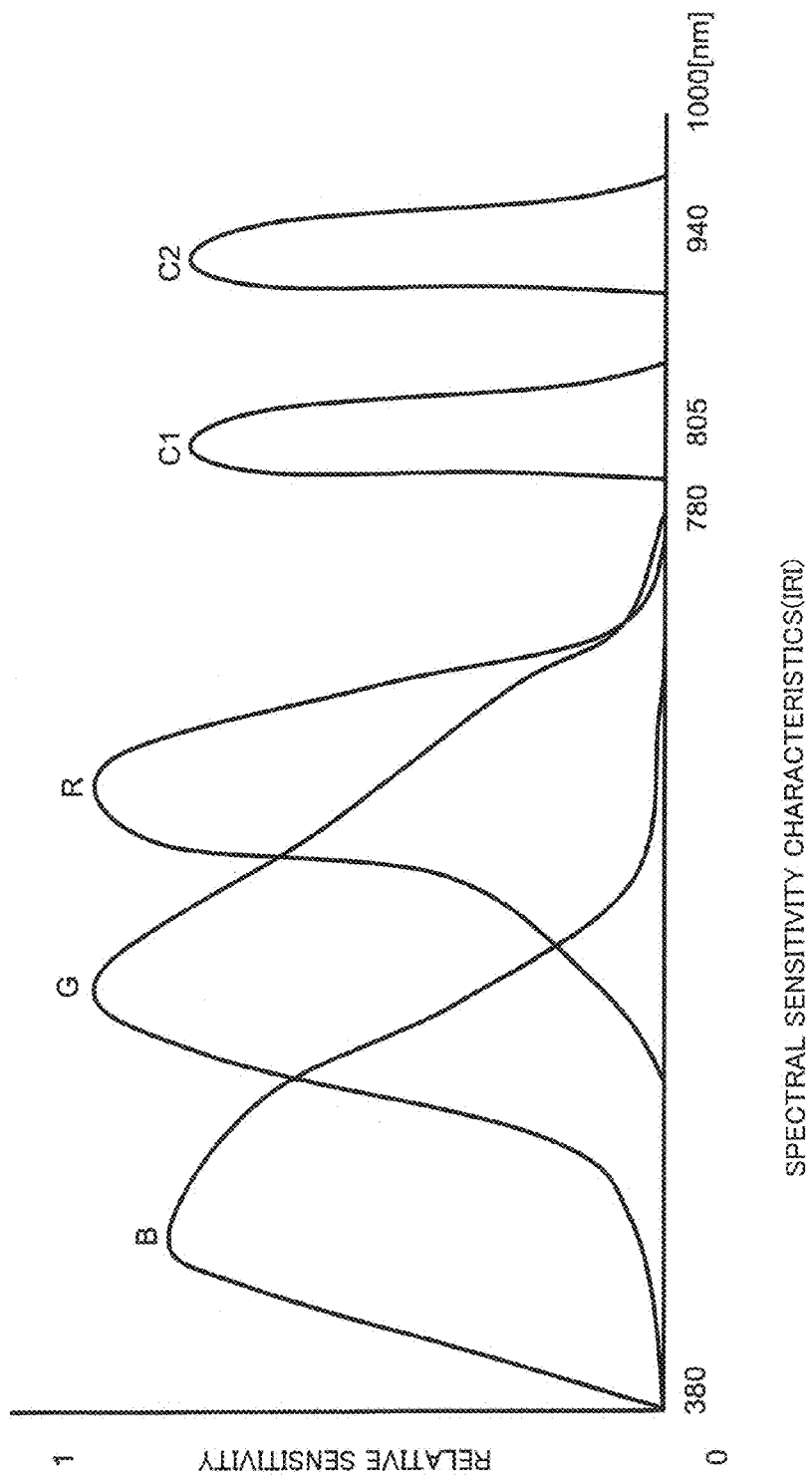
FIG. 5 illustrates an example of the spectral sensitivity characteristics of a color filter used in connection with the first embodiment.

On the other hand, the color filters used in connection with the first embodiment have the spectral sensitivity characteristics illustrated in FIG. 5 (graph), for example. In the first embodiment, the pixel values obtained using the C1 and C2 bands are used to generate the correction information, differing from JP-A-2008-136251 and the like. Therefore, it is desirable that the C1 and C2 bands (special wavelengths) be easily distinguished from the R, G, and B bands. In the example illustrated in FIG. 5, the C1 and C2 bands do not overlap the R, G, and B bands.

2.2 Details of Process

Figure 6:
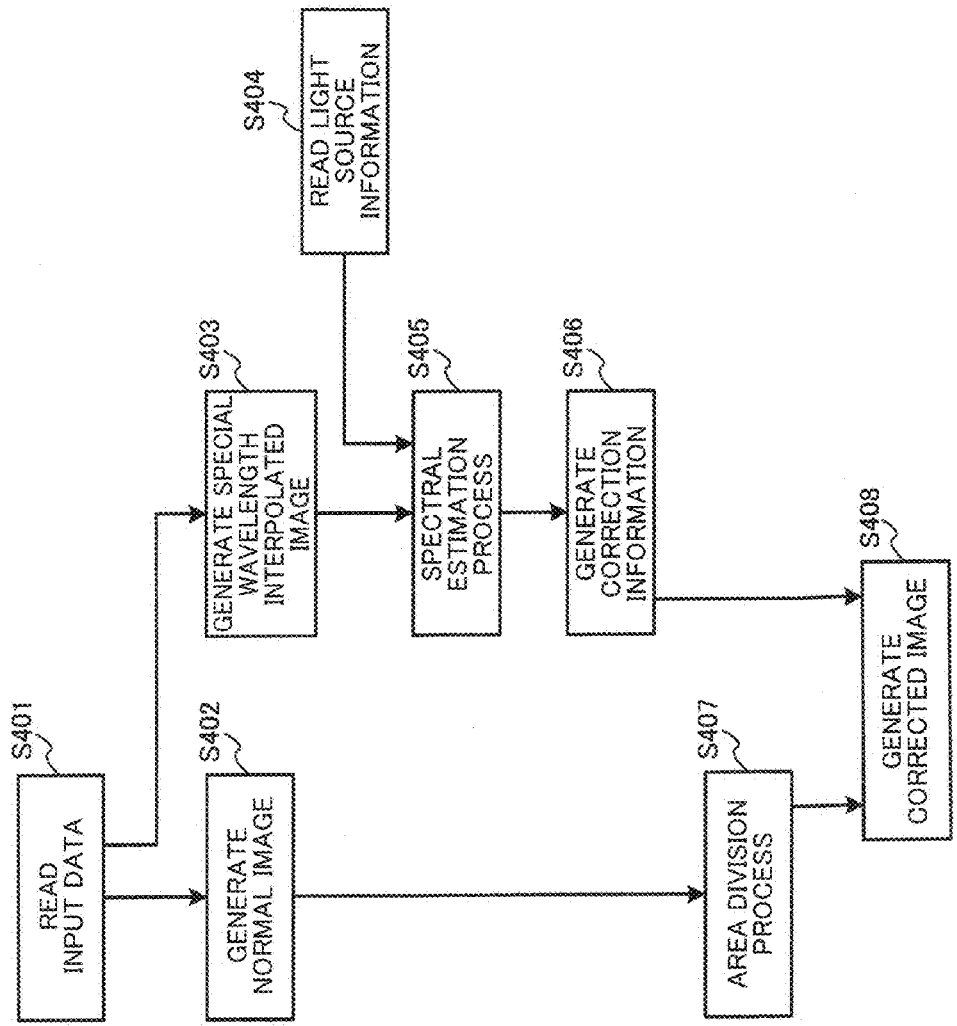
FIG. 6 is a flowchart illustrating the flow of a process according to the first embodiment.

The flow of the corrected image generation process is described below with reference to FIG. 6. The flow of the entire process will be briefly described first, and the details of each step will then be described.

The RAW data (input data) obtained from the multiband image sensor 107 is read (S401), and the demosaicing process is performed on the data of the RGB pixels to generate the normal image (RGB image) (S402).

The demosaicing process is also performed on the data of the special wavelength pixels to generate the special wavelength interpolated image (S403).

The light source information stored in the spectral estimation section 119 is read (S404), and the spectral estimation process is performed using the special wavelength interpolated image generated in the step S403, and the light source information read in the step S404 (S405).

The correction information applied to the normal image is generated using the spectral information estimated in the step S405 (S406). An area division process is performed so that the normal image generated in the step S402 corresponds to the correction information generated in the step S406 (S407), and the correction process is performed on the normal image to generate the corrected image (S408).

The normal image generation process performed in the steps S402 and S403 is described below.

When using a Bayer CFA that includes three types of color filters, the demosaicing process is normally performed using information about the G pixels having the highest density. When using the multiband image sensor that includes the CFA illustrated in FIG. 3, it is possible to perform the demosaicing process on the G pixels, and perform the demosaicing process on the R and B pixels using the high-frequency component of the G normal image. JP-A-8-298669 discloses a technique that performs an interpolation process on the attention pixel taking account of the peripheral pixel information and the edge direction.

When performing the demosaicing process on the special wavelength pixels, it is possible to generate the normal image using various demosaicing methods. However, the multiband image sensor that includes the CFA illustrated in FIG. 3 has a configuration in which the pixels corresponding to the special wavelengths C1 and C2 have a sampling density lower than that of the RGB pixels. Therefore, a defocused image is obtained since the information about the high-frequency component cannot be restored.

In the normal image generation process performed in the steps S402 and S403, the interpolation process is performed using only the information about the RGB pixels when generating the normal image (RGB image), and is performed using only the information about the special wavelength pixels when generating the special wavelength interpolated image. When the RGB spectral sensitivity characteristics and the special wavelength spectral sensitivity characteristics have no correlation, it is possible to retain the structure (edge information) captured using only the special wavelength pixels by performing the demosaicing process independently on the RGB pixels and the special wavelength pixels.

When the RGB spectral sensitivity characteristics and the special wavelength spectral sensitivity characteristics have a correlation, it is possible to generate the normal image that includes a high-frequency component by performing the demosaicing process using the information about each band. The band information used when generating the normal image is determined based on whether or not the RGB spectral sensitivity characteristics and the special wavelength spectral sensitivity characteristics have a correlation. The normal image and the special wavelength interpolated image need not necessarily have identical resolution.

The spectral estimation process performed in the step S405 is described below.

A method that estimates the spectral reflectivity on a pixel basis has been known as a method that estimates the spectral reflectivity of the object from a multiband-captured image.

The position (x, y) within the captured image, the pixel value g(x, y, b) corresponding to the band b, and the spectral reflectivity t(x, y, λ) of the object have the relationship represented by the following expression (1).

$$g(x,y,b) = \int f(b,\lambda)s(\lambda)e(\lambda)t(x,y,\lambda)d\lambda + n(b) \quad (1)$$

where, λ is the wavelength, f(b, λ) is the spectral sensitivity characteristics of the color filter corresponding to the band b, s(λ) is the spectral sensitivity characteristics of the camera, e(λ) is the spectral radiant characteristics of the light source, and n(b) is imaging noise corresponding to the band b. Note that b is a serial number that identifies the band. When using the CFA illustrated in FIG. 3, b is an integer that satisfies $1 \le b \le 5$. The following expression (2) obtained by discretizing the expression (1) in the wavelength direction is used for actual calculations.

$$G(x,y) = FEST(x,y) + N \qquad (2)$$

When the number of sample data in the wavelength direction is referred to as D, and the number of bands is referred to as B, G(x, y) is a matrix having B rows and one column corresponding to the pixel value g(x, y, b) at the position (x, y). Likewise, T(x, y) is a matrix having D rows and one column corresponding to the spectral reflectivity t(x, y, λ), and F is a matrix having B rows and D columns corresponding to the spectral sensitivity characteristics f(b, λ). S is a diagonal matrix having D rows and D columns, and the diagonal element corresponds to the spectral sensitivity characteristics s(λ). E is a diagonal matrix having D rows and D columns, and the diagonal element corresponds to the spectral radiant characteristics e(λ).

N is a matrix having B rows and one column corresponding to the imaging noise n(b). Since the expression (2) aggregates the expressions relating to a plurality of bands using a matrix, the variable b that represents the number of bands is not explicitly described. The integration relating to the wavelength λ is replaced by the matrix product.

The spectral reflectivity of the object is estimated using the Wiener estimation method. The Wiener estimation method estimates the original signal from a signal on which noise is superimposed. The estimated spectral reflectivity can be calculated using the following expression (3) (see the left side of the expression (3)).

$$\hat{T}(x,y) = R_{SS}(FSE)^t((FSE)R_{SS}(FSE)^t + R_{NN})^{-1} G(x,y) \qquad (3)$$

where $R_{SS}$ is a matrix having D rows and D columns, and represents a covariance matrix of the spectral reflectivity of the object. where $R_{nn}$ is a matrix having D rows and D columns, and represents a covariance matrix of noise of the camera used to capture the object. $(\ )^t$ is a transposed matrix, and $(\ )^{-1}$ is an inverse matrix.

Although an example in which the spectral estimation process is performed on the normal image on a pixel basis has been described above, the spectral estimation method is not limited thereto. For example, the spectral estimation process may be performed on the RAW data obtained from the multi-band image sensor 107 on a pixel area basis. The spectrum may be estimated directly from the RAW data by applying a method that performs the spectral estimation process by linear combination of base data corresponding to each area that is calculated in advance by principal component analysis of learning data. It is possible to prevent a situation in which the accuracy of the demosaicing process affects the spectral estimation process estimating the spectrum directly from the RAW data. Note that a normal spectral estimation method performs the spectral estimation process on data subjected to the demosaicing process. It is possible to apply various spectral estimation methods by generating the special wavelength interpolated image.

Figures 7, 8:
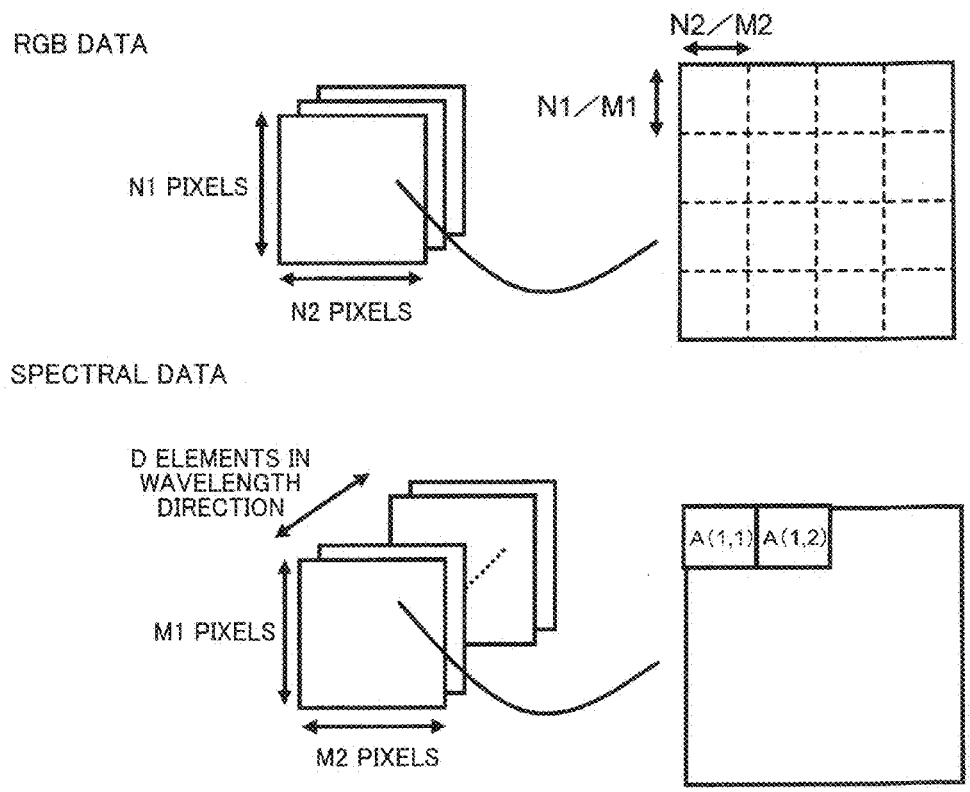
FIG. 7 illustrates an example of a CFA that utilizes correction information generation color filters corresponding to eight bands.
FIG. 8 is a view illustrating an area within a normal image corresponding to one piece of correction information.

The spectral estimation process need not necessarily performed using all of the bands. For example, when using the CFA illustrated in FIG. 7 in which the number of types of special wavelength pixels is large, the spectrum may be estimated from only the information about the special bands. It is possible to implement an accurate spectral estimation process as compared with the case of using three types of information by performing the spectral estimation process using four or more types of information. When the number of types of special wavelength pixels is three or more (see the CFA illustrated in FIG. 3, for example), the spectral estimation process is performed using the normal image (RGB image) in addition to the information about the special bands.

Although an example has been described above in which the light source information stored in the spectrum estimation section 119 is used as the light source information used for the spectral estimation process, information obtained from a light source detection sensor 124 illustrated in FIG. 2 may also be used as the light source information used for the spectral estimation process. It is possible to deal with a light source for which information is not stored in advance by utilizing the information from the light source detection sensor.

The correction information generation process performed in the step S406 is described below.

An example in which the correction information is generated corresponding to each pixel of the spectral data in order to improve the color reproducibility is described below. JP-A-2009-237817 discloses a technique that generates the correction information corresponding to each pixel of the spectral data.

Specifically, a matrix linked to each pixel (p, q) of the spectral data estimated in the step S405 is generated using the estimated spectral data, and a set of the data of the matrix linked to each pixel (p, q) and the pixel position data relating to each pixel (p, is output.

Specifically, the spectral data that includes M1 elements in the vertical direction, M2 elements in the lateral direction, and D elements in the wavelength direction (see FIG. 8) is received, a matrix linked to each pixel (p, q) of the spectral data is generated (corresponding to each pixel position) from the received spectral data using the following expression (4), and a set of the data of the matrix linked to each pixel and the pixel position data relating to each pixel (p, q) is output. Note that the number of pixels of the spectral data is identical with the number of elements of the spectral data. Specifically, p is a natural number that satisfies 0<p≤M1, and q is a natural number that satisfies 0<q≤M2.

$$A(p,q) = KK^T H^T (HKK^T H^T + C)^- \qquad (4)$$

where, A(p, q) is a matrix defined corresponding to each pixel (p, q) of the spectral data, K is a matrix having D rows and M columns in which M pieces of spectral data are arranged as a column vector, and H is a matrix having 3 rows and D columns that defines the input-output relationship (see the following expression (5)) among the original spectral information T(x, y), image data G(x, y) corresponding thereto, and a three-dimensional column vector N that represents noise included in the image data. Specifically, the matrix H is represented by the following expression (6). C is a covariance matrix of noise.

$$G(x,y) = HT(x,y) + N \qquad (5)$$

$$H = FES \qquad (6)$$

Although an example in which the correction information is generated on an area basis has been described above, one piece of correction information may be generated corresponding to the entire image. The process can be simplified by generating one piece of correction information corresponding to the entire image. When generating one piece of correction information corresponding to the entire image, the correction information is represented by the following expression (7), for example. Note that $A_w$ is a correction matrix with respect to the entire image, and M is the number of pieces of spectral data (i.e., M1×M2).

$$A_w = \frac{1}{M} KK^T H^T \left( \frac{1}{M} HKK^T H^T + C \right)^{-1} \quad (7)$$

The area division process performed in the step S407 is described below.

The area division process is performed on the normal image generated in the step S402 taking account of the correction matrix generated in the step S406 so that each area of the normal image corresponds to one correction matrix.

When the normal image includes N1 elements in the vertical direction and N2 elements in the lateral direction, and the spectral data includes M1 elements in the vertical direction and M2 elements in the lateral direction (see FIG. 8), the normal image is divided into areas having a size of N1/M1 in the vertical direction and N2/M2 in the lateral direction.

Note that the area division process (step S407) is unnecessary when generating the special wavelength interpolated image in the step S403 to include N1 elements in the vertical direction and N2 elements in the lateral direction, or upsampling the spectral data to include N1 elements in the vertical direction and N2 elements in the lateral direction during the correction information generation process performed in the step S406. The area division process (step S407) is also unnecessary when one piece of correction information has been generated in the step 406 corresponding to the entire image.

The corrected image generation process performed in the step S408 is described below.

In the step S408, the correction matrix generated in the step S406 is applied to the normal image divided in the step S407 to generate the corrected image. The corrected image is generated by estimating the spectrum on a pixel basis using the normal image and the correction matrix, and converting the estimated spectral data into RGB data.

The spectrum is calculated on a pixel basis using the following expression (8).

$$\hat{T}_{p,q}(x,y) = A(p,q) G(x,y) \quad (8)$$

A matrix that converts the spectral data into RGB data using a spectral estimation means is generated to generate the normal image. The spectral data is normally converted into RGB data using tristimulus values XYZ (see the following expressions (9) to (11)). $x_t$, $y_t$, and $v_t$ defined by a color-matching function are used as the spectral sensitivity characteristics $f(b, \lambda)$ (see the expression (1)). The following expression (12) is obtained by transforming the left side of the expression (8) in the wavelength direction in a sequential manner.

$$X(x,y) = \int x_t(\lambda) s(\lambda) e(\lambda) \hat{t}(x,y,\lambda) d\lambda + n \quad (9)$$

$$Y(x,y) = \int y_t(\lambda) s(\lambda) e(\lambda) \hat{t}(x,y,\lambda) d\lambda + n \quad (10)$$

$$Z(x,y) = \int z_t(\lambda) s(\lambda) e(\lambda) \hat{t}(x,y,\lambda) d\lambda + n \quad (11)$$

$$\hat{t}(x,y,\lambda) \quad (12)$$

The tristimulus values XYZ are converted into RGB data by the following expression (13) using a 3×3 matrix.

$$\begin{bmatrix} R \\ G \\ B \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X \\ Y \\ Z \end{bmatrix} \quad (13)$$

The above process makes it possible to correct the normal image using the accurately estimated spectral information. An example has been described above in which the color of the normal image at each pixel position is corrected using the spectral data estimated from four or more types of data to improve color reproducibility. It is possible to generate an image with improved color reproducibility while minimizing a deterioration in image quality as compared with an image captured using an imaging device provided with three types of color filters, by utilizing a CFA in which pixels from which the wavelength information other than the RGB wavelength information can be acquired are provided while minimizing a decrease in RGB sampling density, utilizing the normal image with respect to the image quality-related information (e.g., edge), and utilizing the spectrum estimated from four or more types of spectra with respect to the spectral information that relates to color reproducibility.

2.3 Modification

A modification is described below in which a specific area (object) is detected using the estimated spectral data, and an image in which the detected area is highlighted is superimposed on the normal image to generate the corrected image.

Figure 9:
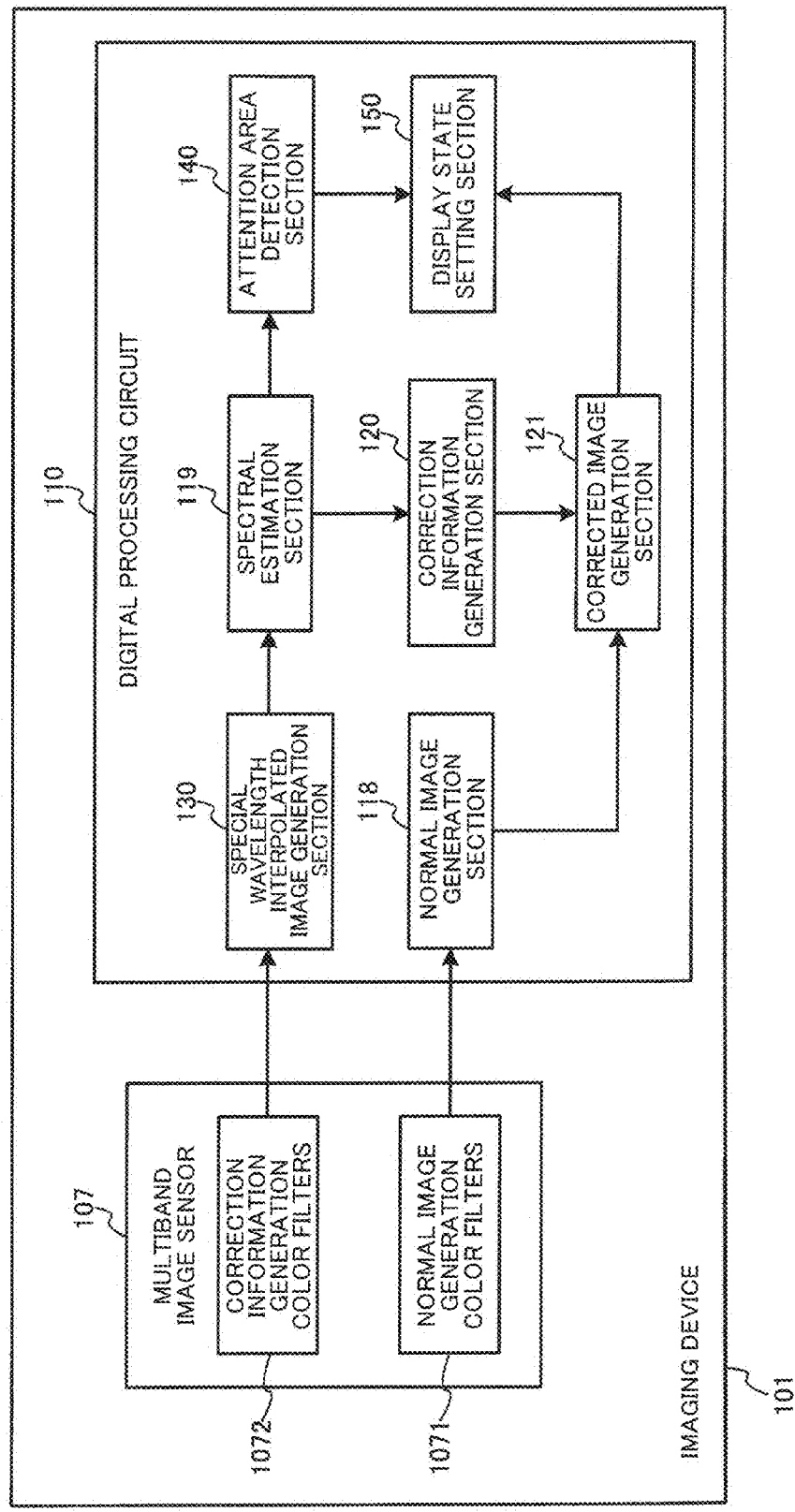
FIG. 9 illustrates a configuration example of a digital processing circuit used in connection with a modification of the first embodiment.

FIG. 9 illustrates a system configuration example according to the modification. The system configuration according to the modification is basically the same as the configuration according to the first embodiment, but differs from the configuration according to the first embodiment as to the process performed by the digital processing circuit 110. Specifically, the digital processing circuit 110 according to the modification further includes an attention area detection section 140 and a display state setting section 150 (see FIG. 9).

The attention area detection section 140 detects an attention area that is to be highlighted within the corrected image.

The display state setting section 150 performs a display state change process on the attention area detected by the attention area detection section 140.

Note that the functions of the attention area detection section 140 and the display state setting section 150 may be implemented by hardware such as a processor (e.g., CPU) or an ASIC (e.g., gate array), a program, or the like.

Figure 10:
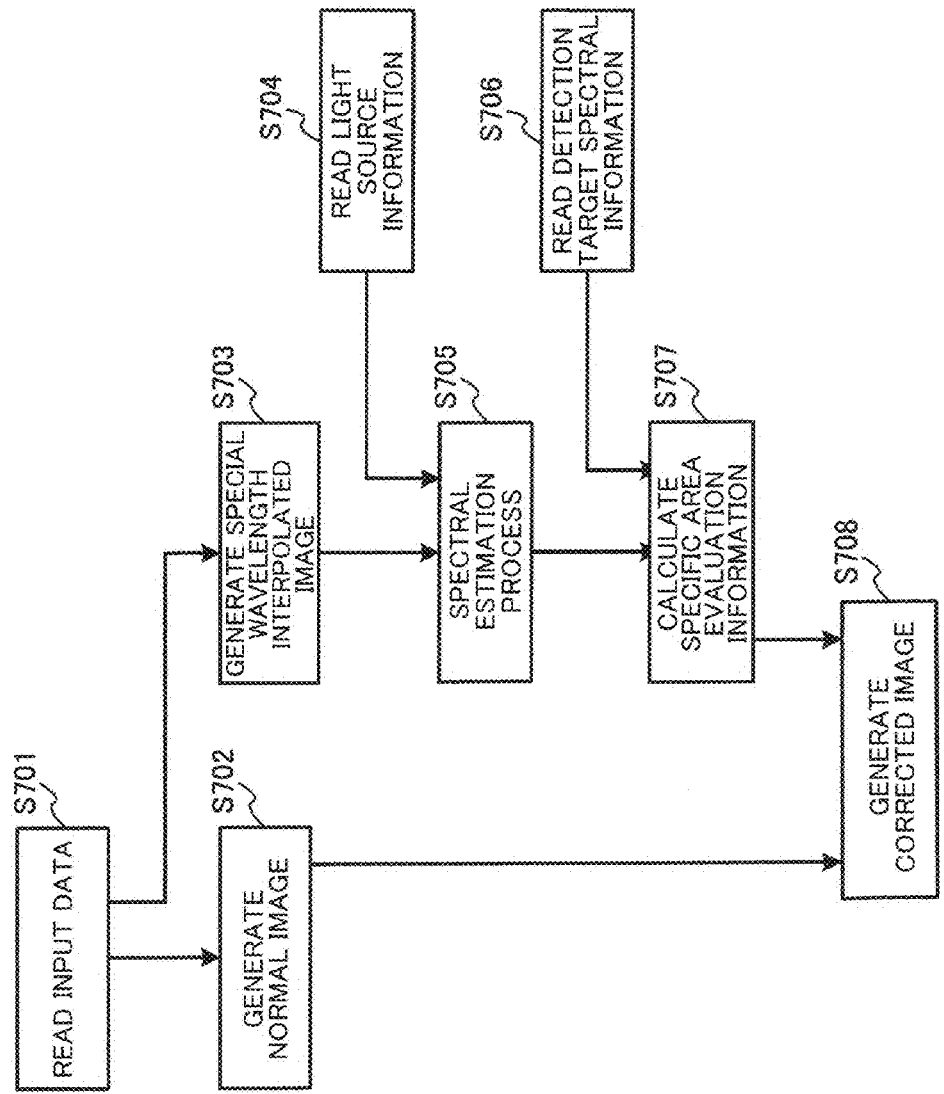
FIG. 10 is a flowchart illustrating the flow of a process according to a modification of the first embodiment.

The flow of the corrected image generation process according to the modification is described below with reference to FIG. 10. Note that steps S701 to S705 are performed in the same manner as described above in connection with the first embodiment.

The spectral information (detection target spectral information) about the detection target is read (S706), and the spectral data estimated in the step S705 is compared with detection target spectral information read in the step S706 to detect an area having a specific spectrum (S707).

Figure 11:
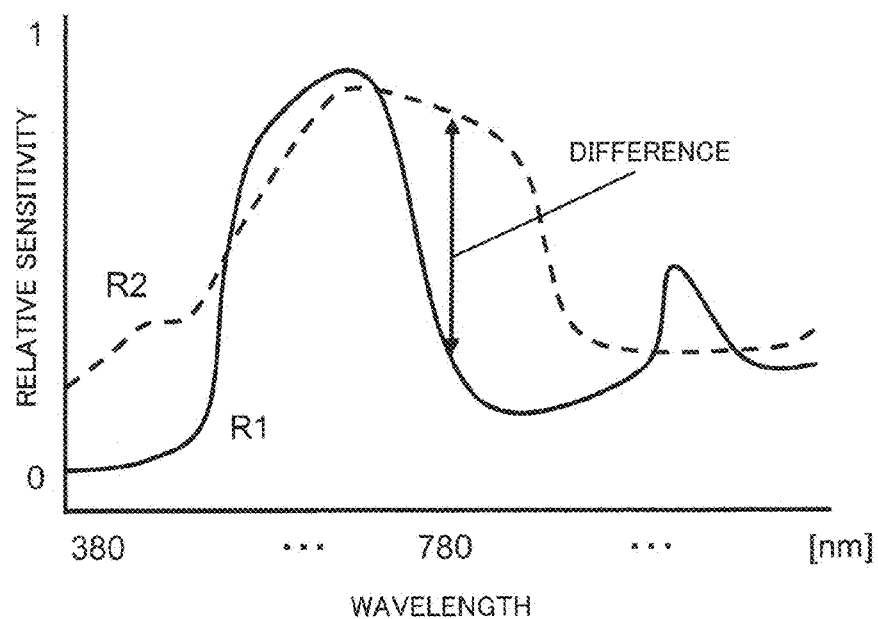
FIG. 11 illustrates an example of comparison between data of a spectral estimate value and detection target spectral data.

The estimated spectrum value data and the detection target spectral data are compared (evaluated) using the difference on a wavelength basis, for example. When comparing spectral data R1 (solid line) and spectral data R2 (broken line) illustrated in FIG. 11, the value E calculated by the following expression (14) may be used as the evaluation value on a pixel basis. In order to simplify the process, it may be determined that the spectral data R1 coincides with the spectral data R2 when the difference between the spectral data R1 and the spectral data R2 is equal to or less than a threshold value set in advance. The wavelength range in the expression (14) is 380 to 780 nm. Note that the value E may be calculated within an arbitrary wavelength range.

$$E = \frac{1}{n} \sum_{i=380}^{780} \sqrt{(R_1(\lambda_i) - R_2(\lambda_i))^2} \qquad (14)$$

where, λ is the wavelength, and n is the number of sample data in the wavelength direction.

Figure 12:
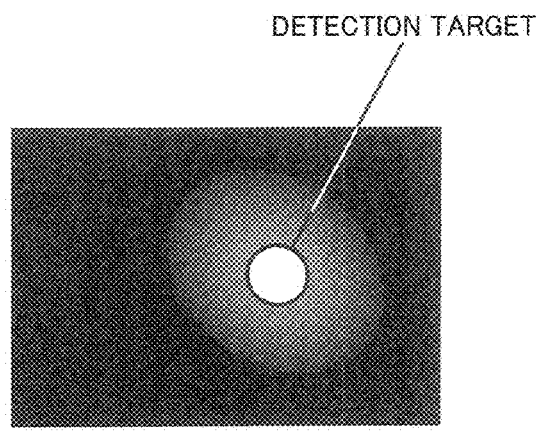
FIG. 12 illustrates an example of a two-dimensional evaluation value map.

The two-dimensional evaluation value map illustrated in FIG. 12 is generated based on the calculated value E. A small value E indicates that the area is close to the detection target spectrum. FIG. 12 illustrates an example in which a high brightness value indicates that the area is close to the detection target spectrum for convenience of explanation.

An image in which an area having the detection target spectrum data is highlighted is displayed using the normal image generated in the step S702 and the evaluation value map generated in the step S707 (S708). A specific area may be highlighted using a method that generates an image in which the contrast of only the area that is determined to be close to the detection target spectrum in the evaluation value map is increased, for example.

The modification has been described above in which a specific area is detected by comparing the spectral data estimated on an area basis from four or more types of data with the spectral data of the detection target specific object, and the normal image in which only the detected area is highlighted is generated. When the imaging device includes one image sensor, it is possible to display a moving image in which a specific area is detected and improved in visibility. This is effective for capturing a medical image that is aimed to detect blood vessels or a lesion. When capturing a medical image, information within a near infrared wavelength band longer than 780 nm may be effective. The embodiments of the invention can achieve similar effects within a near infrared region.

Although an example has been described above in which the area information detected based on the spectral data is used only for the highlight process on the normal image, the area information may be used for another process. For example, it is possible to perform a tracking process that tracks a specific object using the area information detected from a moving image based on the spectral data.

3. Second Embodiment

The second embodiment illustrates an example in which the light source is estimated using information about special wavelength pixels when an image is captured using an unknown light source, and a white balance correction process that corrects the color of the image is performed using information about the estimated light source.

3.1 System Configuration Example

The configuration according to the second embodiment is basically the same as the configuration according to the first embodiment (see FIG. 1), but differs from the configuration according to the first embodiment as to the process performed by the digital processing circuit 110. More specifically, the configuration according to the second embodiment differs from the configuration according to the first embodiment as to the process performed by the spectral estimation section 119, the process performed by the correction information generation section 120, and the process performed by the corrected image generation section 121. The details thereof are described later.

Figure 13:
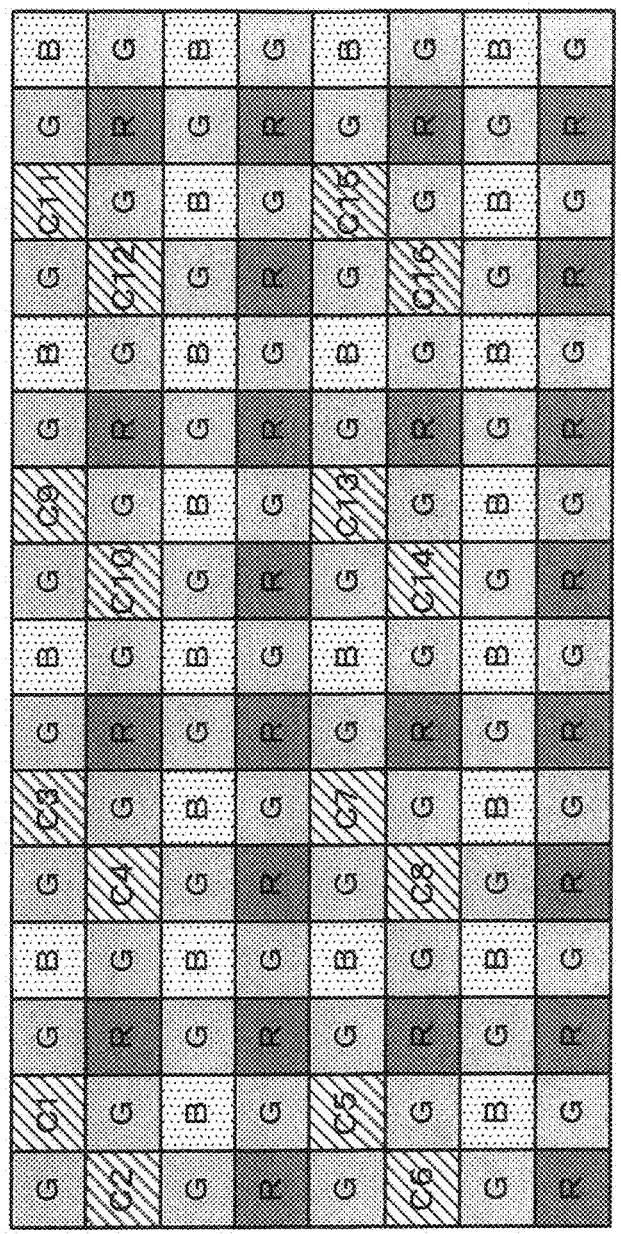
FIG. 13 illustrates an example of a CFA that utilizes correction information generation color filters corresponding to sixteen bands.
Figure 14:
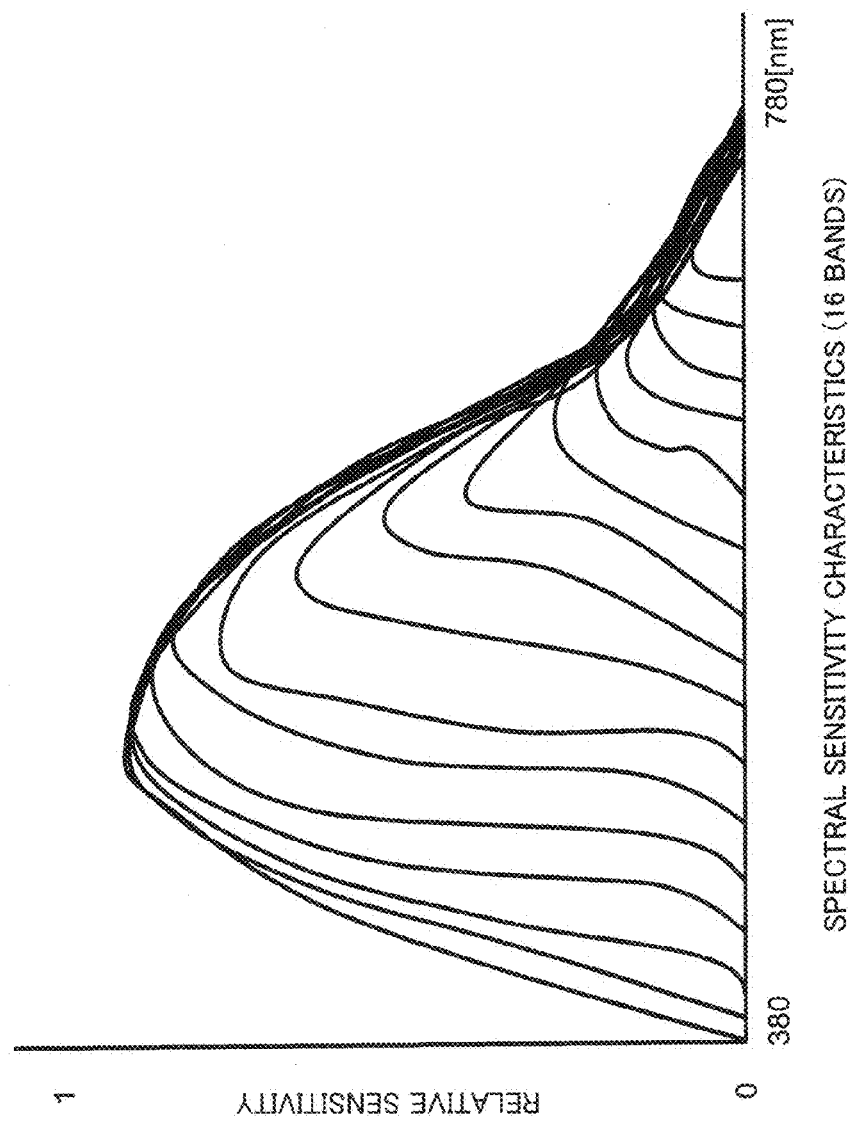
FIG. 14 illustrates an example of the spectral sensitivity characteristics of correction information generation color filters corresponding to sixteen bands.

FIG. 13 illustrates a CFA in which pixels corresponding to sixteen types of special wavelengths C1 to C16 are placed in addition to RGB pixels as an example of a multiband image sensor according to the second embodiment. It was empirically found that the light source can be estimated with sufficient accuracy as long as about sixteen types of information can be obtained. In the second embodiment, the light source is estimated using information about the sixteen types of pixels. The color filters used in connection with the second embodiment have the spectral sensitivity characteristics illustrated in FIG. 14 (graph), for example.

3.2 Details of Process

Figure 15:
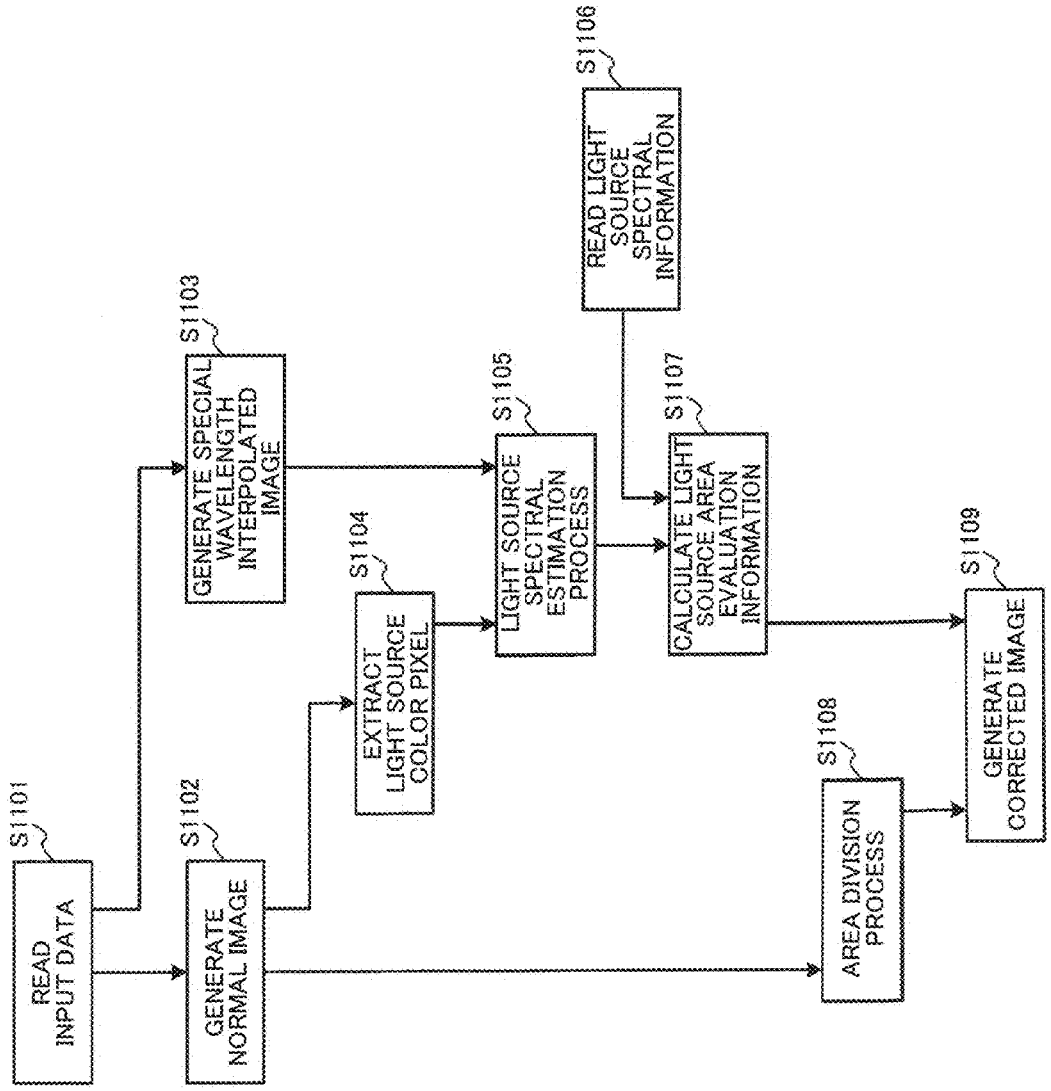
FIG. 15 is a flowchart illustrating the flow of a process according to a second embodiment.

The flow of the white balance-corrected image generation process is described below with reference to FIG. 15 (flowchart).

The RAW data (input data) obtained from the multiband image sensor is read (S1101), and the demosaicing process is performed on the data of the RGB pixels to generate the normal image (S1102).

The demosaicing process is also performed on the data of the special wavelength pixels to generate the special wavelength interpolated image (S1103). In the second embodiment, it is desirable that the number of pieces of data be small in order to simplify the process in the subsequent steps. Therefore, the special wavelength interpolation process may be omitted, and the image sensor driver 108 may be set so that a thinning readout process that reads only the special wavelength pixels is performed when reading the input data in the step S1101. When using the CFA illustrated in FIG. 13 for an image sensor having 4000×3000 pixels, data of 250×375 pixels is obtained when the thinning readout process that reads only the special wavelength pixels is performed, and the pixels enclosed by each bold line in FIG. 16 are handled as identical pixels. Since the information about all of the pixels C1 to C16 is included within each area enclosed by the bold line, it is unnecessary to perform the demosaicing process, and the data can be used directly.

Figures 17, 18:
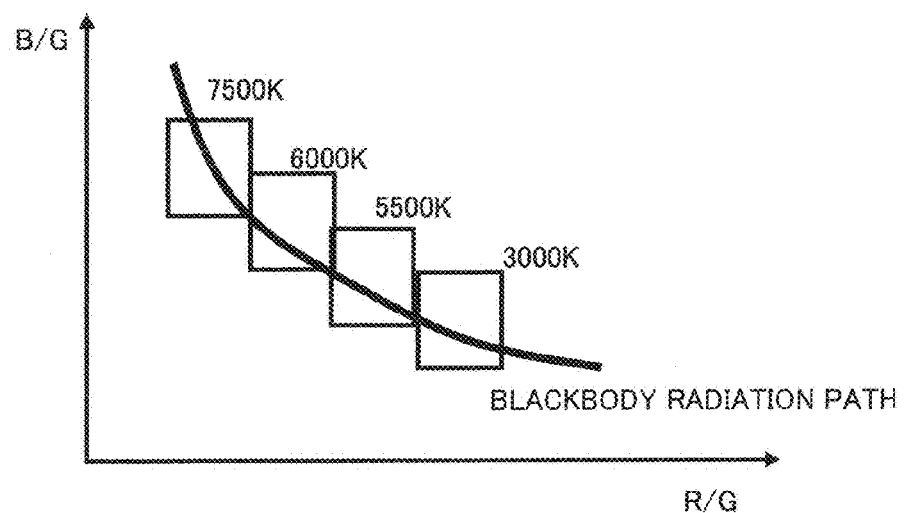
FIG. 17 is a view illustrating a light source color determination process.
FIG. 18 illustrates an example of a CFA that utilizes correction information generation color filters corresponding to sixteen bands when weight is attached to the light source estimation accuracy.

A light source color pixel is extracted within the normal image (S1104). For example, the color temperature (R/G, B/G) may be calculated, and a pixel included within a peripheral area of the blackbody radiation path (see FIG. 17) may be determined to be the light source color pixel. Since it is desirable that the number of pieces of data be small in order to simplify the process, data obtained by reducing the normal image to a size of 250×375 pixels calculated in the step S1103 may be used, for example.

The light source spectral data of the pixels estimated to be the light source color pixel is calculated (S1105). Since it is considered that the spectral reflectivity of the object is constant (white object) independently of the wavelength at the pixels estimated to be the light source color pixel, it is possible to estimate the spectrum of the light source. Specifically, while the spectral reflectivity t(x, y, λ) of the object is estimated in the first embodiment using the expression (1), the spectral radiant characteristics e(λ) are estimated in the second embodiment.

However, even when the pixels extracted in the step S1104 have been determined to be the light source color pixel based on the color temperature evaluation process, the color of a chromatic object may have been erroneously recognized as the light source color.

Therefore, the light source spectral data stored in the correction information generation section 120 is read (S106), and compared with the estimated light source spectral data to determine whether or not the pixels are the light source color pixel (S1107). Even when it is impossible to determine whether the color is the light source color or the object color based on the color temperature evaluation process, it is possible to determine whether the color is the light source color or the object color by performing the spectral comparison process.

The area division process is performed on the normal image (S1108), and the corrected image is generated based on the white balance correction coefficient with respect to the normal image on the basis of the determination results in the step S1107 (S1109). The light source estimation process and the correction coefficient generation process may be performed on the entire image, or may be performed on an arbitrary pixel area basis. When using one correction coefficient corresponding to the entire image, the area division process performed in the step S1108 can be omitted.

The above process makes it possible to improve the light source color extraction accuracy, and perform a correct white balance process. Although an example has been described above in which the light source color pixel extraction process (step S1104) is performed using the normal image, the light source color pixel extraction process may be performed using the information about the special wavelength pixels. Specifically, the color temperature may be calculated from the special wavelength pixels. The color temperature may be calculated using a method that projects the information about the special wavelength pixels onto a color temperature space, or the color temperature (R/G, B/G) may be calculated as RGB information on the assumption that the special wavelength pixels belong to R, G, or B. However, since the special wavelength pixels are placed apart from each other as compared with the RGB pixels, information about different objects may be handled as one piece of information. When the light source estimation accuracy is important, the CFA illustrated in FIG. 18 in which the special wavelength pixels placed close to each other may be used although it is difficult to generate the normal image. In this case, it is possible to perform the light source color pixel extraction process in the step S1104 with high accuracy. The light source spectrum estimated in the step S1105 may be used directly for the corrected image generation process in the step S1109 as the light source estimation results without comparing the light source spectrum estimated in the step S1105 with the light source spectrum read in the step S1106.

3.3 Modification

A modification is described below in which the light source is estimated directly by comparing the spectral data without estimating the light source color pixel, and a white balance-corrected image is generated.

The configuration according to the modification is basically the same as the configuration according to the second embodiment, but differs from the configuration according to the second embodiment as to the process performed by the digital processing circuit 110. Specifically, the configuration according to the modification differs from the configuration according to the second embodiment as to the process performed by the spectral estimation section 119.

Figure 19:
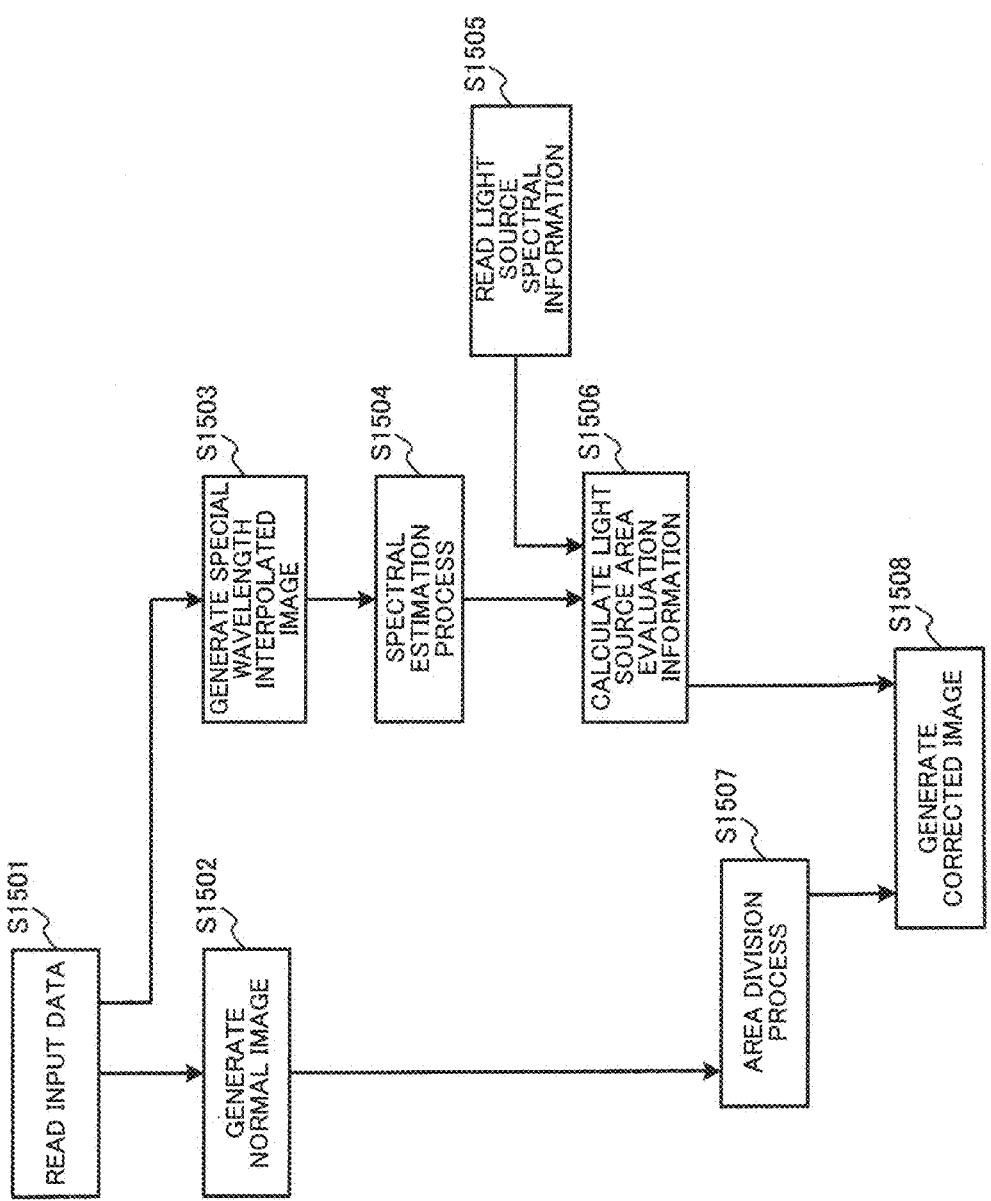
FIG. 19 is a flowchart illustrating the flow of a process according to a modification of the second embodiment.

The flow of the process according to the modification is described below with reference to FIG. 19 (flowchart).

In the second embodiment, the light source spectral estimation process is performed after extracting the light source color pixel within the image. In the modification, the spectrum is calculated corresponding to all of the special wavelength pixels (S1504). However, since the light source information and the spectral reflectivity of the object are unknown, the spectral estimation process cannot be performed in this state. According to the modification, the spectral estimation process is performed on the assumption that the light source is a constant light source (white light source) independently of the wavelength.

Figure 20:
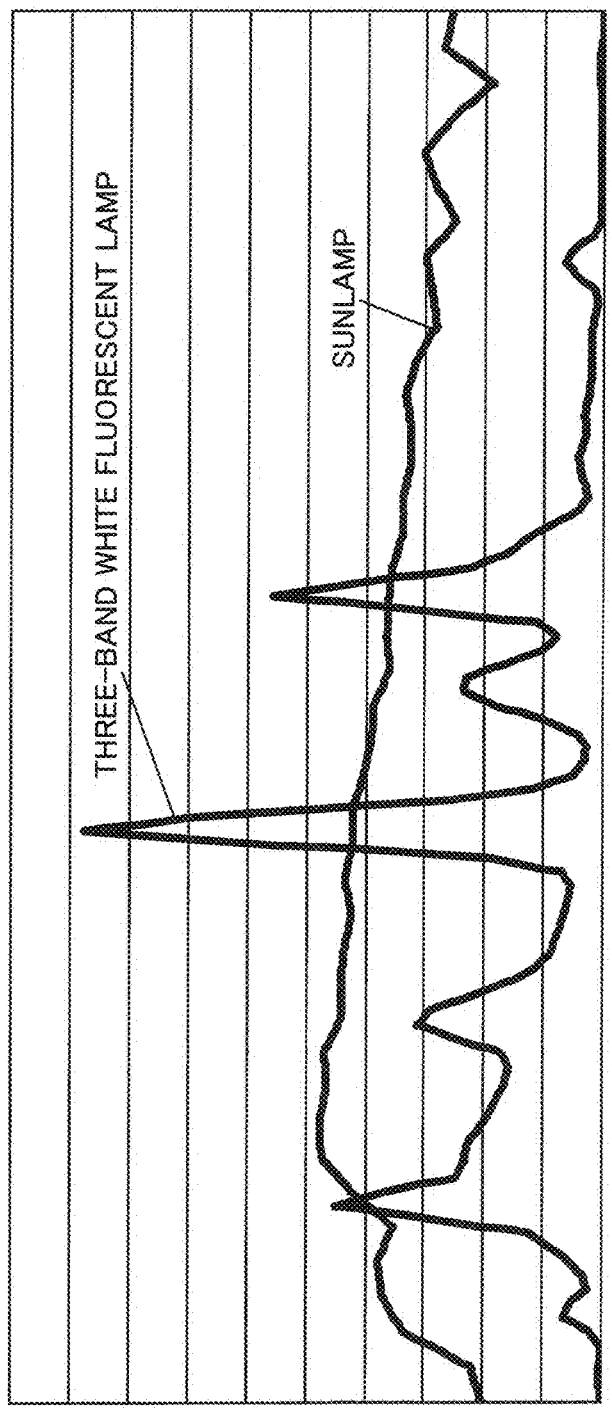
FIG. 20 illustrates an example of light source spectral data.

The light source spectral information is read (S1505). For example, light source information is read that has a spectrum in which bright lines are observed within a specific wavelength region (see the three-band white fluorescent lamp illustrated in FIG. 20). The spectral data estimated in the step S1504 is compared with the light source spectral data read in the step S1505 to determine whether or not the spectral data and the light source spectral data coincide with each other as to features (e.g., bright lines) within a specific wavelength region to estimate the light source (S1506). When the light source that illuminates the object has a spectrum characterized by features such as bright lines, it is considered that the features are reflected in the estimated spectral data.

The modification is not suitable for detecting a light source having a broad spectrum within a wide wavelength region (e.g., sunlamp), but is effective for a light source (e.g., fluorescent lamp) having bright lines for which it is normally difficult to perform the white balance correction process.

4. Summary of Method

The method according to the first embodiment and the method according to the second embodiment are summarized below.

The imaging device 101 according to the first embodiment and the second embodiment includes the image sensor 107 that includes a color filter array in which the normal image generation color filters 1071 and the correction information generation color filters 1072 are placed in an array, the normal image generation color filters 1071 corresponding to three or more bands, and the correction information generation color filters 1072 differing in spectral sensitivity characteristics from the normal image generation color filters 1071, the normal image generation section 118 that performs the interpolation process on the pixel values obtained using the normal image generation color filters 1071 to generate the normal image in which the pixel values of the missing pixels are interpolated, the spectral estimation section 119 that performs the spectral estimation process based on the pixel values obtained using at least the correction information generation color filters 1072, the correction information generation section 120 that generates the correction information that corrects the pixel values of the normal image based on the spectral estimate value obtained by the spectral estimation section 119, and the corrected image generation section 121 that performs the correction process on the normal image based on the correction information to generate the corrected image.

In the embodiments of the invention, the color filter corresponding to one band is assigned to each pixel (see FIG. 3, for example). The R color filter, the G color filter, and the B color filter are used as the normal image generation color filters 1071, and the C1 color filter and the C2 color filter are used as the correction information generation color filters 1072.

The normal image generation section 118 performs the interpolation process on the pixel values obtained using the normal image generation color filters 1071 to generate the normal image in which the pixel values of the missing pixels are interpolated.

Since the color filter corresponding to one band is assigned to each pixel, only the G pixel value is obtained from the pixel to which the G color filter is assigned, and the R pixel value, the B pixel value, the C1 pixel value, and the C2 pixel value are not obtained from the pixel to which the G color filter is assigned. Since the pixel to which the G color filter is assigned does not have the R pixel value, the B pixel value, the C1 pixel value, and the C2 pixel value, the pixel to which the G color filter is assigned is referred to as a missing pixel with respect to R, B, C1, and C2.

For example, the interpolation process is performed on the R missing pixel using the R pixel values obtained from the pixels situated around the missing pixel to estimate the R pixel value of the missing pixel.

The interpolation process is performed using the pixel values obtained using the normal image generation color filters 1071 (e.g., R color filter, G color filter, and B color filter). The normal image in which the R pixel value, the G pixel value, and the B pixel value are calculated corresponding to each pixel is thus obtained.

The spectral estimation section 119 performs the spectral estimation process based on the pixel values obtained using at least the correction information generation color filters 1072. A specific example of the spectral estimation process has been described above.

The correction information generation section 120 generates the correction information that corrects the pixel values of the normal image based on the spectral estimate value.

The corrected image generation section 121 performs the correction process on the normal image based on the correction information to generate the corrected image.

This makes it possible to correct the normal image using the estimated spectral information while suppressing a deterioration in image quality.

It is also possible to suppress an increase in cost and an increase in size of the device by utilizing the single-ship multiband image sensor 107.

In order to prevent a deterioration in accuracy of the normal image, it is desirable to place the correction information generation color filters while minimizing a decrease in sampling density of the normal image generation color filters as compared with the Bayer array.

Specifically, the normal image generation color filters 1071 may include the R color filter, the G color filter, and the B color filter. The correction information generation color filters 1072 may be placed in the color filter array at a sampling density lower than that of the R color filter, the G color filter, and the B color filter.

This makes it possible to minimize a deterioration in accuracy of the normal image (RGB image), for example. Since the pixel values obtained using the correction information generation color filters are merely used to correct the normal image, it is unnecessary to place the correction information generation color filters at high density.

The G color filter included in the normal image generation color filters 1071 may be placed in the color filter array at the intersections of an odd-numbered row and an odd-numbered column and the intersections of an even-numbered row and an even-numbered column, or the intersections of an odd-numbered row and an even-numbered column and the intersections of an even-numbered row and an odd-numbered column.

Specifically, the G color filter may be placed in a staggered pattern in the same manner as in the Bayer array.

This makes it possible to generate a highly accurate G normal image. It is also possible to suppress a deterioration in accuracy of the R normal image and the B normal image by interpolating the R pixel value and the B pixel value by using the high-frequency component of the G normal image, for example.

The correction information generation color filters 1072 are placed at a density lower than that of the normal image generation color filters 1071. Therefore, the number of pixel values obtained using the correction information generation color filters 1072 is smaller than the number of pixels of the entire normal image (as described above with reference to FIG. 8).

Therefore, the correction information generation section 120 may generate the correction information that corresponds to a plurality of pixel values of the normal image based on data of one spectral estimate value that is obtained from one pixel value during the spectral estimation process.

This makes it unnecessary to perform a process that generates the correction information corresponding to one pixel of the normal image. Therefore, the amount of processing can be reduced, for example.

The imaging device 101 according to the first embodiment and the second embodiment may include the attention area detection section 140 that detects the attention area within the normal image that includes an object image having information within a specific wavelength band based on data of the spectral estimate value, and the display state setting section 150 that performs the display state setting process on the detected attention area.

The display state setting process brightly displays the attention area, and darkly displays the area outside the attention area, or improves the visibility of the attention area by enclosing the attention area with a red line, for example.

This makes it possible to improve visibility (e.g., lesion detection visibility or blood vessel detection visibility) when capturing a medical image or the like, for example. Since the single-chip image sensor 107 is used in the first embodiment and the second embodiment, it is possible to display a moving image in real time, for example.

The imaging device 101 according to the first embodiment and the second embodiment may include the special wavelength interpolated image generation section 130 that performs a special wavelength interpolated image generation process that generates the special wavelength interpolated image that is used to generate the correction information based on the pixel values obtained using the correction information generation color filters 1072. The special wavelength interpolated image generation section 130 may perform an interpolation process on the pixel values obtained using the correction information generation color filters as the special wavelength interpolated image generation process to generate the special wavelength interpolated image in which the pixel values of the missing pixels are interpolated. The spectral estimation section 119 may perform the spectral estimation process based on the special wavelength interpolated image.

This makes it possible to apply various spectral estimation methods that utilize the special wavelength interpolated image, for example.

The special wavelength interpolated image generation section 130 may generate the special wavelength interpolated image having a resolution lower than that of the normal image generated by the normal image generation section 118. The spectral estimation section 119 may perform the spectral estimation process at the resolution of the special wavelength interpolated image based on at least the pixel values of the special wavelength interpolated image. The correction information generation section 120 may generate the correction information that corresponds to a plurality of pixel values of the normal image based on data of one spectral estimate value obtained as a result of the spectral estimation process. The corrected image generation section 121 may perform the correction process at the resolution of the normal image using the generated correction information.

Note that the expression "perform the correction process at the resolution of the normal image" means that one piece of correction information is used for the correction process performed on a plurality of pixel values of the normal image, as described above with reference to FIG. 8.

This makes it possible to perform the correction information generation process using the special wavelength interpolated image having low resolution, and reduce the amount of processing, for example.

The spectral estimation section 119 may extract the light source color pixel that represents the color of the light source from the normal image, and estimate the light source spectrum of the extracted light source color pixel to calculate the light source spectral estimate value. The correction information generation section 120 may compare data of the light source spectral estimate value with the light source spectral data stored in advance to estimate the light source.

This makes it possible to accurately estimate the light source even when it is difficult to determine the light source using only the information about the RGB pixel values, for example.

The corrected image generation section 121 may perform the correction process that corrects the white balance based on the estimated light source on the normal image.

This makes it possible to implement a highly accurate white balance correction process even when it is difficult to determine the light source using only the information about the RGB pixel values, for example.

The correction information generation section 120 may generate the correction information corresponding to each area among a plurality of areas that are set within the normal image. The corrected image generation section 121 may perform the correction process on the normal image using the correction information corresponding to each area within the normal image that has been generated by the correction information generation section 120.

This makes it possible to perform a highly accurate correction process corresponding to each area set within the image, for example. This configuration is effective for improving the attention area/specific spectral area determination accuracy, and is also is effective for the white balance correction process when different light sources are present within the image.

The correction information generation section 120 may perform the comparison process that compares data of the spectral estimate value estimated by the spectral estimation section 119 with the detection target spectral data stored in advance, detect a specific spectral area having a specific spectrum based on the result of the comparison process, and generate the correction information based on the detection result for the specific spectral area.

This makes it possible to detect the specific spectral area having a specific spectrum, and implement a highly accurate area detection process even when it is difficult to detect the specific spectral area using only the RGB information, for example.

The spectral estimation section 119 may extract a light source spectral data measurement pixel that represents the color of the light source from the special wavelength interpolated image, and estimate the light source spectrum of the extracted light source spectral data measurement pixel to calculate the light source spectral estimate value. The corrected image generation section 121 may perform a process that corrects the white balance based on the light source spectral estimate value, on the normal image.

It is possible to estimate the light source while reducing the amount of processing by estimating the light source color pixel from the information obtained from the special wavelength interpolated image, and directly estimating the light source spectrum, for example.

The spectral estimation section 119 may perform the spectral estimation process on the special wavelength interpolated image based on the white light source spectral data. The correction information generation section 120 may compare data of the spectral estimate value with the light source spectral data stored in advance within a specific wavelength region to estimate the light source.

This makes it possible to simply estimate the light source having a characteristic spectrum having bright lines, for example.

The spectral estimation section 119 performs the thinning readout process that reads the pixel values obtained using the correction information generation color filters 1072 without reading the pixel values obtained using the normal image generation color filters 1071 when reading the pixel values from the image sensor 107, and perform the spectral estimation process using the pixel values read by the thinning readout process.

This makes it possible to increase the processing speed, for example.

The normal image generation color filters 1071 and the correction information generation color filters 1072 included in the image sensor 107 may be an infrared filter that has the peak wavelength within the infrared wavelength region.

This makes it possible to generate a more accurate corrected image when the image is characterized by the spectrum within the infrared region (e.g., medical image), for example.

The infrared wavelength region may be a wavelength band of 790 to 820 nm or 905 to 970 nm.

This makes it possible to use an infrared filter having the peak wavelength within a wavelength band of 790 to 820 nm or 905 to 970 nm, for example.

As a modification, the imaging device 101 may include the image sensor 107 that includes a color filter array in which the normal image generation color filters 1071 and the correction information generation color filters 1072 are placed in an array, the normal image generation color filters 1071 corresponding to three or more bands, and the correction information generation color filters 1072 differing in spectral sensitivity characteristics from the normal image generation color filters 1071, the normal image generation section 118 that performs the interpolation process on the pixel values obtained using the normal image generation color filters 1071 to generate the normal image in which the pixel values of the missing pixels are interpolated, the spectral estimation section 119 that performs the spectral estimation process based on the pixel values obtained using at least the correction information generation color filters 1072, the attention area detection section 140 that detects the attention area within the normal image that includes an object image having information within a specific wavelength band based on data of the spectral estimate value, and the display state setting section 150 that performs the display state setting process on the detected attention area.

Note that part or the majority of the process performed by the imaging device and the like according to the embodiments of the invention may be implemented by a program. In this case, the imaging device and the like according to the embodiments of the invention are implemented by causing a processor (e.g., CPU) to execute a program. Specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a computer (i.e., a device that includes an operation section, a processing section, a storage section, and an output section) to function as each section according to the embodiments of the invention (i.e., a program that causes a computer to execute the process implemented by each section) is stored in the information storage device.

The imaging device and the like according to the embodiments of the invention may include a processor and a memory. The processor may be a central processing unit (CPU), for example. Note that the processor is not limited to a CPU. Various other processors such as a graphics processing unit (GPU) and a digital signal processor (DSP) may also be used. The processor may be a hardware circuit that includes an application specific integrated circuit (ASIC). The memory stores a computer-readable instruction. Each section of the imaging device and the like according to the embodiments of the invention is implemented by causing the processor to execute the instruction. The memory may be a semiconductor memory (e.g., static random access memory (SRAM) or dynamic random access memory (DRAM)), a register, a hard disk, or the like. The instruction may be an instruction included in an instruction set that forms a program, or may be an instruction that causes a hardware circuit of the processor to operate.

Although the first embodiment and the second embodiment have been described in detail above, those skilled in the art will readily appreciate that many modifications are possible in the first embodiment and the second embodiment without materially departing from the novel teachings and advantages of the invention. Accordingly, all such modifications are intended to be included within the scope of the invention. Any term cited with a different term having a broader meaning or the same meaning at least once in the specification and the drawings can be replaced by the different term in any place in the specification and the drawings. The configuration and the operation of the imaging device and the image generation method are not limited to those described in connection with the first embodiment and the second embodiment. Various modifications and variations may be made of the above embodiments.

What is claimed is:

1. An imaging device comprising:
an image sensor that includes a color filter array in which normal image generation color filters and correction information generation color filters are placed in an array, the normal image generation color filters corresponding to three or more bands, and the correction information generation color filters differing in spectral sensitivity characteristics from the normal image generation color filters; and
a digital processing circuit configured to:
perform an interpolation process on pixel values obtained using the normal image generation color filters to generate a normal image in which pixel values of missing pixels are interpolated;
perform a spectral estimation process based on pixel values obtained using at least the correction information generation color filters;
perform a correction information generating process to generate correction information that corrects the pixel values of the normal image based on a spectral estimate value obtained by the spectral estimation process; and
perform a correction process on the normal image based on the correction information to generate a corrected image,
wherein the correction information generation process generates the correction information that corresponds to a plurality of pixel values of the normal image based on data of one spectral estimate value that is obtained from one pixel value during the spectral estimation process.

2. The imaging device as defined in claim 1, wherein the normal image generation color filters include an R color filter, a G color filter, and a B color filter, and
wherein the correction information generation color filters are placed in the color filter array at a sampling density lower than that of the R color filter, the G color filter, and the B color filter.

3. The imaging device as defined in claim 2, wherein the G color filter included in the normal image generation color filters is placed in the color filter array at intersections of an odd-numbered row and an odd-numbered column and intersections of an even-numbered row and an even-numbered column, or intersections of an odd-numbered row and an even-numbered column and intersections of an even-numbered row and an odd-numbered column.

4. The imaging device as defined in claim 1, wherein the digital processing circuit is further configured to:
perform a special wavelength interpolated image generation process that generates a special wavelength interpolated image that is used to generate the correction information based on the pixel values obtained using the correction information generation color filters,
wherein the digital processing circuit performs an interpolation process on the pixel values obtained using the correction information generation color filters as the special wavelength interpolated image generation process to generate the special wavelength interpolated image in which pixel values of missing pixels are interpolated, and
wherein the digital processing circuit performs the spectral estimation process based on the special wavelength interpolated image.

5. The imaging device as defined in claim 4, wherein the special wavelength interpolated image generation process generates the special wavelength interpolated image having a resolution lower than that of the normal image generated by the normal image generation process,
wherein the digital processing circuit performs the spectral estimation process at the resolution of the special wavelength interpolated image based on at least the pixel values of the special wavelength interpolated image,
wherein the correction information generation process generates the correction information that corresponds to a plurality of pixel values of the normal image based on data of one spectral estimate value obtained as a result of the spectral estimation process, and
wherein the digital processing circuit performs the correction process at the resolution of the normal image using the generated correction information.

6. The imaging device as defined in claim 1, wherein the spectral estimation process extracts a light source color pixel that represents a color of a light source from the normal image, and estimates a light source spectrum of the extracted light source color pixel to calculate a light source spectral estimate value, and
wherein the correction information generation process compares data of the light source spectral estimate value with light source spectral data stored in advance to estimate the light source.

7. The imaging device as defined in claim 6, wherein the digital processing circuit performs the correction process that corrects a white balance based on the estimated light source, on the normal image.

8. The imaging device as defined in claim 1, wherein the correction information generation process generates the correction information corresponding to each area among a plurality of areas that are set within the normal image, and
wherein the digital processing circuit performs the correction process on the normal image using the correction information corresponding to each area within the normal image that has been generated by the correction information generation process.

9. The imaging device as defined in claim 1, wherein the correction information generation process includes performing a comparison process that compares data of the spectral estimate value estimated by the spectral estimation section with detection target spectral data stored in advance, detecting a specific spectral area having a specific spectrum based on a result of the comparison process, and generating the correction information based on a detection result for the specific spectral area.

10. The imaging device as defined in claim 4, wherein the spectral estimation process extracts a light source spectral data measurement pixel that represents a color of a light source from the special wavelength interpolated image, and estimates a light source spectrum of the extracted light source spectral data measurement pixel to calculate a light source spectral estimate value, and
wherein the corrected image generation process includes a process that corrects a white balance based on the light source spectral estimate value, on the normal image.

11. The imaging device as defined in claim 4, wherein the the digital processing circuit performs the spectral estimation process on the special wavelength interpolated image based on white light source spectral data, and
wherein the correction information generation process includes comparing data of the spectral estimate value with light source spectral data stored in advance within a specific wavelength region to estimate a light source.

12. The imaging device as defined in claim 1, wherein the spectral estimation process includes performing a thinning readout process that reads the pixel values obtained using the correction information generation color filters without reading the pixel values obtained using the normal image generation color filters when reading the pixel values from the image sensor, and performing the spectral estimation process using the pixel values read by the thinning readout process.

13. The imaging device as defined in claim 1, wherein the normal image generation color filters and the correction information generation color filters included in the image sensor include an infrared filter that has a peak wavelength within an infrared wavelength region.

14. The imaging device as defined in claim 13, wherein the infrared wavelength region is a wavelength band of 790 to 820 nm or 905 to 970 nm.

15. An imaging device comprising:
an image sensor that includes a color filter array in which normal image generation color filters and correction information generation color filters are placed in an array, the normal image generation color filters corresponding to three or more bands, and the correction information generation color filters differing in spectral sensitivity characteristics from the normal image generation color filters; and
a digital processing circuit configured to:
perform an interpolation process on pixel values obtained using the normal image generation color filters to generate a normal image in which pixel values of missing pixels are interpolated;
perform a spectral estimation process based on pixel values obtained using at least the correction information generation color filters;
perform a correction information generating process to generate correction information that corrects the pixel values of the normal image based on a spectral estimate value obtained by the spectral estimation process;
perform a correction process on the normal image based on the correction information to generate a corrected image;
detect an attention area within the normal image that includes an object image having information within a specific wavelength band based on data of the spectral estimate value; and
perform a display state setting process on the detected attention area.

16. The imaging device as defined in claim 15, wherein the correction information generation process generates the correction information that corresponds to a plurality of pixel values of the normal image based on data of one spectral estimate value that is obtained from one pixel value during the spectral estimation process.

17. An imaging device comprising:
an image sensor that includes a color filter array in which normal image generation color filters and correction information generation color filters are placed in an array, the normal image generation color filters corresponding to three or more bands, and the correction information generation color filters differing in spectral sensitivity characteristics from the normal image generation color filters; and
a digital processing circuit configured to:
perform an interpolation process on pixel values obtained using the normal image generation color filters to generate a normal image in which pixel values of missing pixels are interpolated;
perform a spectral estimation process based on pixel values obtained using at least the correction information generation color filters;
detect an attention area within the normal image that includes an object image having information within a specific wavelength band based on data of a spectral estimate value obtained by the spectral estimation process; and
perform a display state setting process on the detected attention area.

18. An image generation method comprising:
performing an interpolation process on pixel values obtained using normal image generation color filters corresponding to three or more bands to generate a normal image in which pixel values of missing pixels are interpolated;
performing a spectral estimation process based on pixel values obtained using at least correction information generation color filters that differ in spectral sensitivity characteristics from the normal image generation color filters;
detecting an attention area within the normal image that includes an object image having information within a specific wavelength band based on data of a spectral estimate value obtained as a result of the spectral estimation process; and performing a display state setting process on the detected attention area.

* * * * *